(12) United States Patent
Tanaka

(10) Patent No.: US 9,865,395 B2
(45) Date of Patent: Jan. 9, 2018

(54) METHOD AND DEVICE FOR MANUFACTURING CAPACITOR ELEMENT

(71) Applicant: MURATA MANUFACTURING CO., LTD., Kyoto (JP)

(72) Inventor: Junya Tanaka, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 383 days.

(21) Appl. No.: 14/490,208

(22) Filed: Sep. 18, 2014

(65) Prior Publication Data

US 2015/0083315 A1     Mar. 26, 2015

(30) Foreign Application Priority Data

Sep. 20, 2013   (JP) ................... 2013-195411
Aug. 5, 2014    (JP) ................... 2014-159440

(51) Int. Cl.
    *B32B 38/04*    (2006.01)
    *B32B 38/10*    (2006.01)
    (Continued)

(52) U.S. Cl.
    CPC ............. *H01G 4/30* (2013.01); *H01G 4/232* (2013.01); *H01G 13/00* (2013.01); *H01G 13/006* (2013.01); *B26D 7/32* (2013.01); *B32B 37/18* (2013.01); *B32B 38/0004* (2013.01); *B32B 38/10* (2013.01); *B32B 38/18* (2013.01);
    (Continued)

(58) Field of Classification Search
    USPC .......................................................... 83/27
    See application file for complete search history.

(56) References Cited

U.S. PATENT DOCUMENTS

2003/0051587 A1* 3/2003 Zeuschner ............... B26D 7/32
                                                       83/27
2013/0199717 A1    8/2013 Tanaka et al.

FOREIGN PATENT DOCUMENTS

CN        103247442 A    8/2013
JP         61-248413 A   11/1986
(Continued)

OTHER PUBLICATIONS

An Office Action; "Notice of Grounds of Rejection," issued by the Japanese Patent Office dated Dec. 6, 2016, which corresponds to Japanese Patent Application No. 2014-159440 and is related to U.S. Appl. No. 14/490,208; with English language translation.

*Primary Examiner* — Linda L Gray
(74) *Attorney, Agent, or Firm* — Studebaker & Brackett PC

(57) ABSTRACT

A method for manufacturing a capacitor element includes singulating a mother block into a plurality of laminate blocks having a shape of an elongated, substantially rectangular parallelepiped, by dividing the mother block in rows; rolling each of the plurality of laminate blocks; and singulating each of the plurality of laminate blocks into a plurality of laminate chips having a shape of a substantially rectangular parallelepiped, by dividing the plurality of laminate blocks after rolling in columns. The step of rolling each of the plurality of laminate blocks includes the step of moving the plurality of laminate blocks placed on a stage, along a direction in which the plurality of laminate blocks are arranged side by side, thereby sequentially pushing each of the plurality of laminate blocks to an end portion of the stage and causing each of the plurality of laminate blocks to rotationally fall from the end portion.

20 Claims, 13 Drawing Sheets

(51) Int. Cl.
*H01G 4/30* (2006.01)
*B65G 47/26* (2006.01)
*B26D 7/32* (2006.01)
*H01G 13/00* (2013.01)
*H01G 4/232* (2006.01)
*B32B 38/18* (2006.01)
*B65G 47/28* (2006.01)
*B32B 38/00* (2006.01)
*B32B 37/18* (2006.01)

(52) U.S. Cl.
CPC .......... *B32B 38/1808* (2013.01); *B65G 47/28* (2013.01); *Y10T 156/1075* (2015.01); *Y10T 156/13* (2015.01)

(56) References Cited

FOREIGN PATENT DOCUMENTS

| | | | |
|---|---|---|---|
| JP | H06-132182 A | 5/1994 | |
| JP | 06-349669 A | 12/1994 | |
| JP | H10-224129 A | 8/1998 | |
| JP | 2013-162037 A | 8/2013 | |

\* cited by examiner

METHOD AND DEVICE FOR MANUFACTURING CAPACITOR ELEMENT

CROSS REFERENCE RELATED APPLICATIONS

This applications claims benefit of priority to Japanese Patent Application No. 2014-159440 filed Aug. 5, 2014, and Japanese Patent Application No. 2013-195411 filed Sep. 20, 2013, the entire content of each of which is incorporated herein by reference.

TECHNICAL FIELD

The present technical field relates to a method and a device for manufacturing a capacitor element as an electronic component, and more particularly to a method for manufacturing a capacitor element in the shape of a substantially rectangular parallelepiped, having an element body portion including dielectric layers and internal electrode layers laminated alternately along a predetermined direction.

BACKGROUND

In recent years, downsizing and capacity increase of laminated ceramic capacitors as capacitor elements have been dramatically promoted. Generally, an element body portion of a laminated ceramic capacitor is fabricated by: fabricating a mother block by laminating a plurality of ceramic green sheets each having a conductive pattern, which will serve as an internal electrode layer, printed thereon; singulating the mother block into a plurality of bar-like laminate blocks by dividing the mother block in rows; singulating each of the plurality of laminate blocks into a plurality of laminate chips each having a predetermined size, by further dividing the plurality of laminate blocks in columns; and burning the singulated laminate chips. On that occasion, as downsizing and capacity increase of laminated ceramic capacitors described above are promoted, the ceramic green sheet to be laminated and the conductive pattern printed thereon are also being made thinner.

Further, in order to promote downsizing and capacity increase of capacitor elements, it is also effective to increase an area of a portion where internal electrode layers arranged in a laminated state face each other (i.e., an effective area). As a technique for increasing the effective area, Japanese Patent Laying-Open No. 61-248413 and Japanese Patent Laying-Open No. 6-349669 each disclose a technique for narrowing dielectric layers at portions located adjacent to internal electrode layers in a direction perpendicular to a direction connecting a pair of external electrodes (i.e., dielectric layers at portions forming side surfaces where dielectric layers are exposed, of four external surfaces of a laminated ceramic capacitor extending substantially parallel to a lamination direction of the internal electrode layers).

These techniques divide a mother block such that conductive patterns are exposed at a cut surface corresponding to a side surface of a laminate chip, cover the cut surface with a sufficiently thin dielectric material made of, for example, a covering ceramic green sheet, ceramic slurry, or the like, and thereby can narrow the dielectric layers at portions forming the side surfaces of the laminated ceramic capacitor described above.

Generally, a mother block is often divided by so-called push cutting, in which a push-cutting blade is caused to penetrate into the mother block along a dividing plane which is substantially parallel to a lamination direction of ceramic green sheets, along the lamination direction. However, when the push cutting described above is adopted in a case where a ceramic green sheet and a conductive pattern are thinned, a case where the techniques disclosed in Japanese Patent Laying-Open No. 61-248413 and Japanese Patent Laying-Open No. 6-349669 are applied, and the like, there occurs a problem that various defects due to a shear force applied to a mother block tend to be caused at a cut surface thereof.

For example, in the case where a ceramic green sheet is considerably thinned, there occurs a problem that peeling-off tends to be caused at an end portion of the ceramic green sheet due to a shear force applied to the ceramic green sheet, which may cause deterioration in yield and degradation in reliability. Further, in the case where the techniques disclosed in Japanese Patent Laying-Open No. 61-248413 and Japanese Patent Laying-Open No. 6-349669 are applied, there occurs a problem that an end portion of a conductive pattern may deform due to a shear force applied to the conductive pattern, and conductive patterns which originally should not be brought into conduction may come into contact with each other at the cut surface, and as a result, electrical isolation therebetween cannot be ensured, which may cause deterioration in yield and degradation in reliability.

In order to suppress occurrence of these problems, it is effective to cause a push-cutting blade to penetrate in a dividing step along a dividing plane which is substantially parallel to a lamination direction of ceramic green sheets, along a direction perpendicular to the lamination direction. Thereby, a shear force caused by push cutting can be suppressed from being applied to the ceramic green sheets and the conductive patterns along the lamination direction, and occurrence of the problems described above can be effectively prevented.

However, in the step of singulating a mother block into a plurality of bar-like laminate blocks by dividing the mother block in rows, it is difficult to perform the push cutting along the above direction, for convenience of handling. Accordingly, the push cutting along the above direction is adopted in the step of singulating each of the plurality of bar-like laminate blocks into a plurality of laminate chips by dividing the plurality of bar-like laminate blocks in columns.

On the other hand, also in that case, in order to push-cut the plurality of bar-like laminate blocks obtained by dividing the mother block, along the above direction, it is necessary to rotate each of the plurality of bar-like laminate blocks 90° about an axis line, prior to dividing the plurality of bar-like laminate blocks in columns. However, as downsizing of laminated ceramic capacitors is promoted, each of the plurality of bar-like laminate blocks also has a very small shape, and thus it is very difficult in terms of handling to rotate them one by one, resulting in a considerable pressure on manufacturing cost.

SUMMARY

Accordingly, the present disclosure has been made to solve the aforementioned problems, and an object of the present disclosure is to provide a method and a device for manufacturing a capacitor element capable of manufacturing a capacitor element having a smaller size, a larger capacity, and a higher reliability, efficiently and with a good yield.

A method for manufacturing a capacitor element in accordance with the present disclosure is a method for manufacturing a capacitor element having an element body portion including dielectric layers and internal electrode layers laminated alternately along a predetermined direction, including the steps of: preparing a mother block formed by laminating a plurality of dielectric green sheets which will serve as the dielectric layers and a plurality of conductive patterns which will serve as the internal electrode layers; singulating the mother block into a plurality of laminate blocks having a shape of an elongated, substantially rectangular parallelepiped, by dividing the mother block in rows along a first dividing plane which is substantially parallel to a lamination direction of the plurality of conductive patterns; rolling each of the plurality of laminate blocks such that each of a pair of first cut surfaces does not face a laminate block located adjacent thereto, the pair of first cut surfaces being formed in each of the plurality of laminate blocks by dividing the mother block; and singulating each of the plurality of laminate blocks into a plurality of laminate chips having a shape of a substantially rectangular parallelepiped, by dividing the plurality of laminate blocks after rolling in columns along a second dividing plane which is substantially parallel to the lamination direction of the plurality of conductive patterns in the plurality of laminate blocks after rolling, and is substantially perpendicular to the pair of first cut surfaces. The step of rolling each of the plurality of laminate blocks includes the steps of placing the plurality of laminate blocks on a stage such that each of the pair of first cut surfaces remains to face the laminate block located adjacent thereto, and relatively moving, on the stage, the plurality of laminate blocks placed thereon, with respect to the stage, along a direction in which the plurality of laminate blocks are arranged side by side, thereby sequentially pushing each of the plurality of laminate blocks to an end portion of the stage and causing each of the plurality of laminate blocks to rotationally fall from the end portion, and thereby causing one of the pair of first cut surfaces of each of the plurality of laminate blocks which have rotationally fallen to land in a region outside the stage.

In the method for manufacturing the capacitor element in accordance with the present disclosure, it is preferable that, in the step of singulating each of the plurality of laminate blocks into the plurality of laminate chips, the plurality of laminate blocks are collectively divided by causing a push-cutting blade to penetrate into the plurality of laminate blocks along the second dividing plane, toward a direction perpendicular to the lamination direction of the plurality of conductive patterns in the plurality of laminate blocks after rotational falling.

In the method for manufacturing the capacitor element in accordance with the present disclosure, it is preferable that, when it is assumed that t is a thickness of the stage, and d is a distance between the pair of first cut surfaces of each of the plurality of laminate blocks, a stage having the thickness t which satisfies a condition of $d/2 \leq t \leq d$ is used as the stage.

In the method for manufacturing the capacitor element in accordance with the present disclosure, the plurality of conductive patterns may be made of a ferromagnetic material. In that case, it is preferable that, in the step of rolling each of the plurality of laminate blocks, the plurality of laminate blocks after rotational falling are magnetically attracted and held by attraction by a magnet sheet, by arranging the magnet sheet beforehand in the region outside the stage.

In the method for manufacturing the capacitor element in accordance with the present disclosure, it is preferable that, as the magnet sheet, a magnet sheet in which magnetic poles having different polarities are alternately arranged in a direction parallel to an extending direction of each of the plurality of laminate blocks placed on the stage is used.

In the method for manufacturing the capacitor element in accordance with the present disclosure, in the step of singulating the mother block into the plurality of laminate blocks, the mother block may be divided such that the plurality of conductive patterns are exposed at each of the pair of first cut surfaces.

In the method for manufacturing the capacitor element in accordance with the present disclosure, in the step of singulating each of the plurality of laminate blocks into the plurality of laminate chips, each of the plurality of laminate blocks may be divided such that the plurality of conductive patterns are exposed at each of a pair of second cut surfaces formed in each of the plurality of laminate chips by dividing each of the plurality of laminate blocks.

The method for manufacturing the capacitor element in accordance with the present disclosure may further include the step of covering each of the pair of second cut surfaces of each of the plurality of laminate chips with a dielectric material.

Preferably, the method for manufacturing the capacitor element in accordance with the present disclosure further includes the step of centering the plurality of laminate blocks collectively in a longitudinal direction thereof, by sandwiching the plurality of laminate blocks after rotational falling collectively, along the longitudinal direction, between a pair of centering guide members, after the step of rolling each of the plurality of laminate blocks and before the step of singulating each of the plurality of laminate blocks into the plurality of laminate chips.

Preferably, the method for manufacturing the capacitor element in accordance with the present disclosure further includes the step of gathering the plurality of laminate blocks collectively in the direction in which the plurality of laminate blocks are arranged side by side, by sandwiching the plurality of laminate blocks after rotational falling collectively, along the direction, between a pair of gathering guide members, after the step of rolling each of the plurality of laminate blocks and before the step of singulating each of the plurality of laminate blocks into the plurality of laminate chips.

A device for manufacturing a capacitor element in accordance with the present disclosure is a device for manufacturing a capacitor element having an element body portion including dielectric layers and internal electrode layers laminated alternately along a predetermined direction, including: a stage on which a plurality of laminate blocks are placed, the plurality of laminate blocks having a shape of an elongated, substantially rectangular parallelepiped, and being singulated by dividing a mother block in rows, the mother block being formed by laminating a plurality of dielectric green sheets which will serve as the dielectric layers and a plurality of conductive patterns which will serve as the internal electrode layers; a rolling mechanism for rolling each of the plurality of laminate blocks by relatively moving, on the stage, the plurality of laminate blocks placed on the stage, with respect to the stage, along a direction in which the plurality of laminate blocks are arranged side by side, thereby sequentially pushing each of the plurality of laminate blocks to an end portion of the stage and causing each of the plurality of laminate blocks to rotationally fall from the end portion; and a landing surface located in a region outside the stage for receiving the plurality of laminate blocks which are caused to rotationally fall by the rolling mechanism. The stage is configured such that the plurality of laminate blocks can be arranged thereon side by side in such a manner that each of a pair of first cut surfaces faces a laminate block located adjacent thereto, the pair of first cut surfaces being formed in each of the plurality of laminate blocks by dividing the mother block, and the landing surface is configured such that one of the pair of first cut surfaces of each of the plurality of laminate blocks which have rotationally fallen can land thereon.

In the device for manufacturing the capacitor element in accordance with the present disclosure, it is preferable that the rolling mechanism is constituted of a stage driving mechanism for moving the stage, and a movement restriction member for restricting movement of the plurality of laminate blocks placed on the stage. In that case, the device is configured such that, by moving the stage by the stage driving mechanism, the plurality of laminate blocks placed on the stage abut the movement restriction member, and thereby each of the plurality of laminate blocks is sequentially pushed to an end portion of the stage.

In the device for manufacturing the capacitor element in accordance with the present disclosure, it is preferable that, when it is assumed that t is a thickness of the stage, and d is a distance between the pair of first cut surfaces of each of the plurality of laminate blocks, the thickness t satisfies a condition of $d/2 \leq t \leq d$.

Preferably, the device for manufacturing the capacitor element in accordance with the present disclosure further includes a magnet sheet located in the region outside the stage for magnetically attracting and holding the plurality of laminate blocks by attraction, when the plurality of conductive patterns are made of a ferromagnetic material. In that case, the landing surface is constituted of a main surface of the magnet sheet.

Preferably, in the device for manufacturing the capacitor element in accordance with the present disclosure, the magnet sheet is a magnet sheet in which magnetic poles having different polarities are alternately arranged in a direction parallel to an extending direction of each of the plurality of laminate blocks placed on the stage.

In the device for manufacturing the capacitor element in accordance with the present disclosure, the plurality of laminate blocks may be those in which the plurality of conductive patterns are exposed at each of the pair of first cut surfaces.

Preferably, the device for manufacturing the capacitor element in accordance with the present disclosure further includes a pair of centering guide members for centering the plurality of laminate blocks collectively in a longitudinal direction thereof, by sandwiching the plurality of laminate blocks after rotational falling collectively, along the longitudinal direction.

Preferably, the device for manufacturing the capacitor element in accordance with the present disclosure further includes a pair of gathering guide members for gathering the plurality of laminate blocks collectively in the direction in which the plurality of laminate blocks are arranged side by side, by sandwiching the plurality of laminate blocks after rotational falling collectively, along the direction.

According to the present disclosure, a capacitor element having a smaller size, a larger capacity, and a higher reliability can be manufactured efficiently and with a good yield.

The foregoing and other objects, features, aspects and advantages of the present disclosure will become more apparent from the following detailed description of the present disclosure when taken in conjunction with the accompanying drawings.

DETAILED DESCRIPTION

Figure 1:
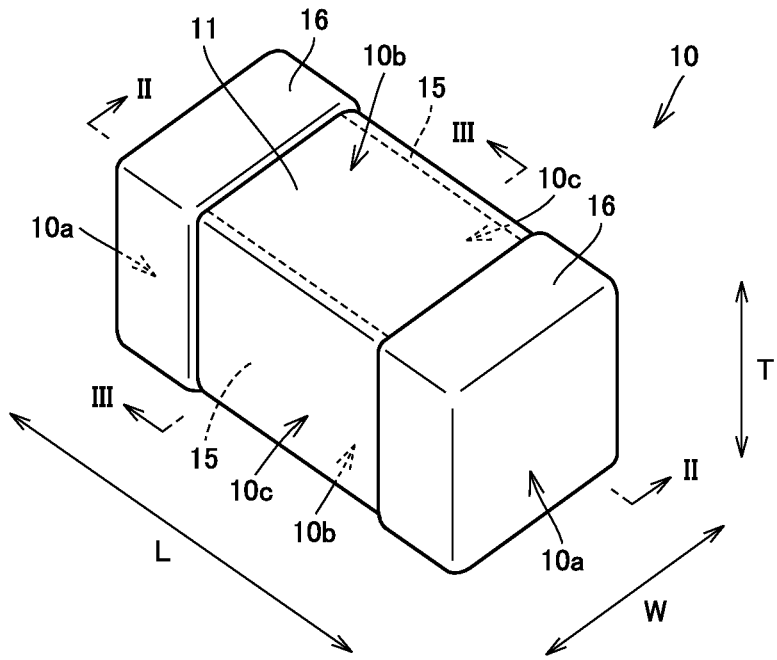
FIG. 1 is a schematic perspective view of a laminated ceramic capacitor manufactured by a method for manufacturing a capacitor element in accordance with an embodiment of the present disclosure.

Hereinafter, an embodiment of the present disclosure will be described in detail with reference to the drawings. In the embodiment described below, identical or common parts will be designated by the same reference numerals, and the description thereof will not be repeated.

Examples of a capacitor element manufactured by applying the present disclosure include a laminated ceramic capacitor in which a ceramic material is used as a dielectric material, a laminated metalized film capacitor in which a resin film is used as a dielectric material, and the like. In the embodiment described below, a description will be given of a case where the present disclosure is applied to a laminated ceramic capacitor.

Figure 2:
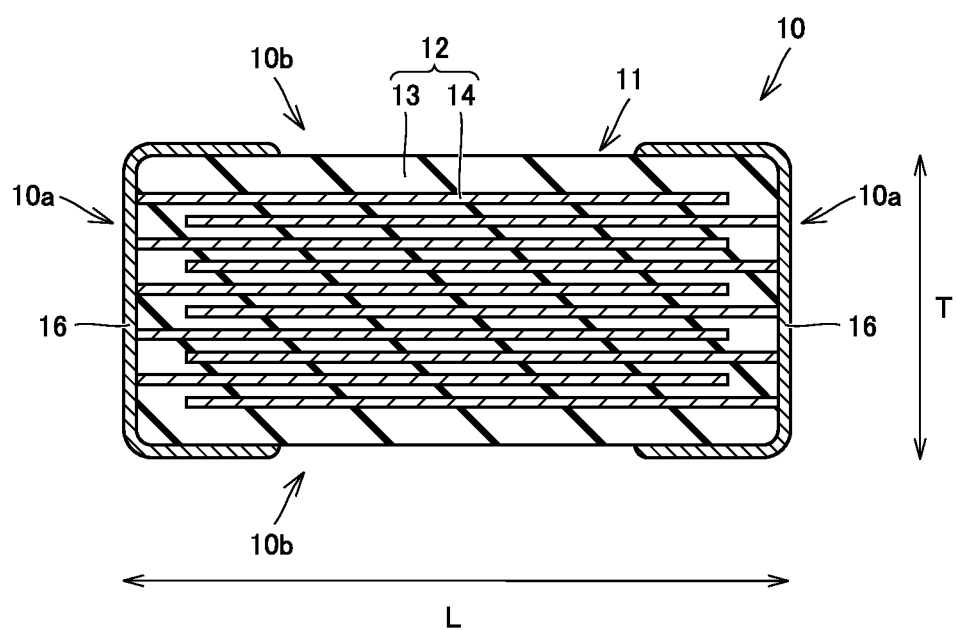
FIG. 2 is a schematic cross sectional view of the laminated ceramic capacitor shown in FIG. 1 taken along a line II-II shown in FIG. 1.
Figure 3:
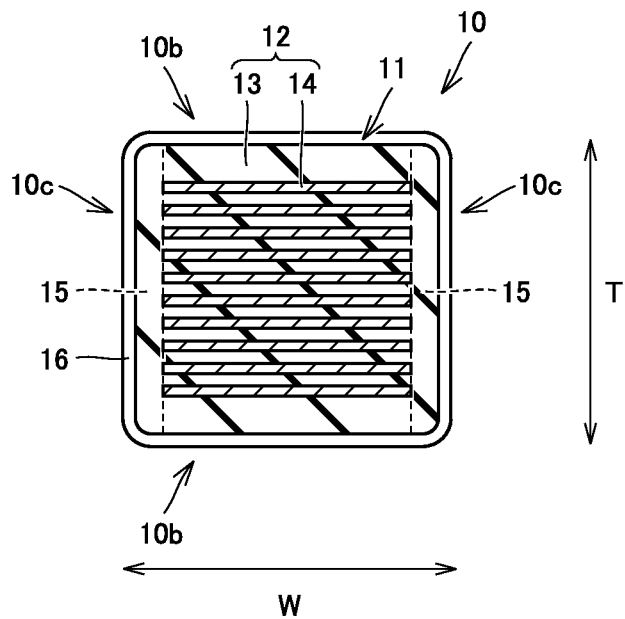
FIG. 3 is a schematic cross sectional view of the laminated ceramic capacitor shown in FIG. 1 taken along a line III-III shown in FIG. 1.
Figure 4:
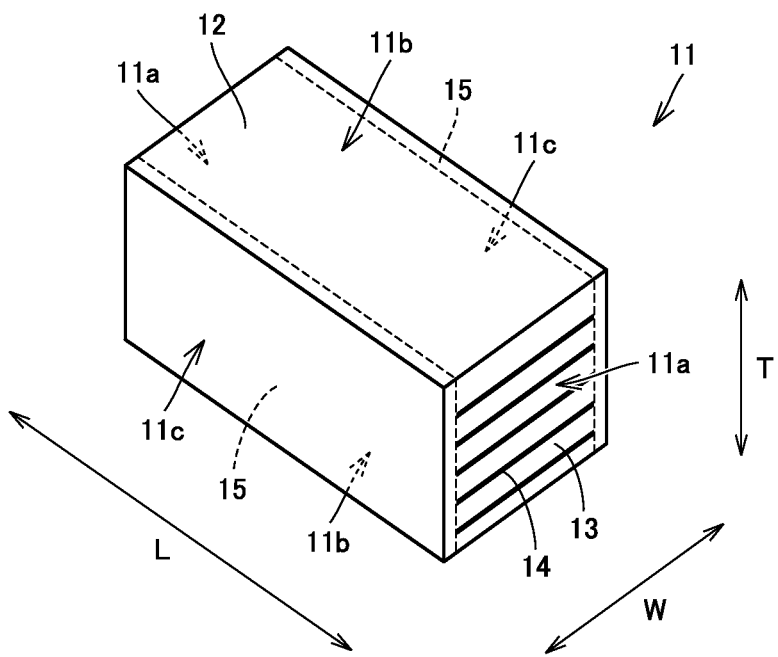
FIG. 4 is a schematic perspective view of only an element body portion of the laminated ceramic capacitor shown in FIG. 1.
Figure 5:
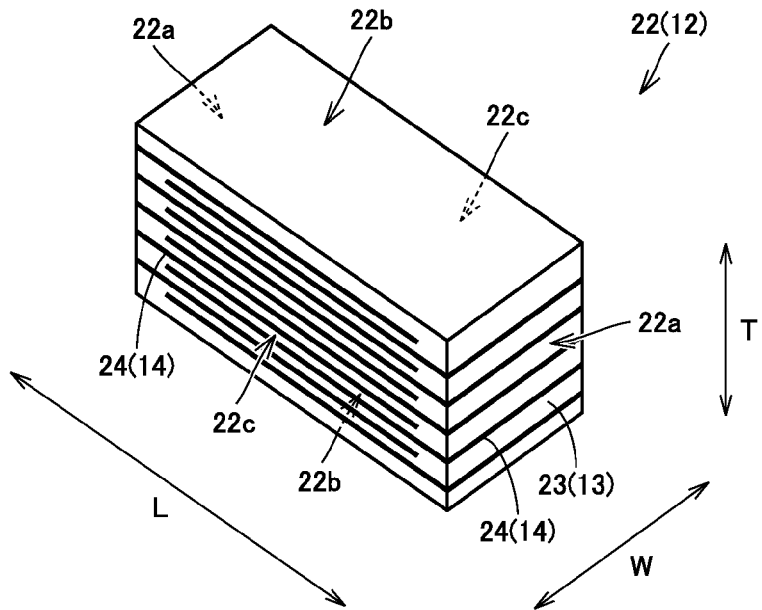
FIG. 5 is a schematic perspective view of a laminate chip as a precursor of a laminate constituting a portion of the element body portion shown in FIG. 4.

FIG. 1 is a schematic perspective view of a laminated ceramic capacitor manufactured by a method for manufacturing a capacitor element in accordance with an embodiment of the present disclosure. FIGS. 2 and 3 are schematic cross sectional views of the laminated ceramic capacitor shown in FIG. 1 taken along lines II-II and III-III, respectively, shown in FIG. 1. Further, FIG. 4 is a schematic perspective view of only an element body portion of the laminated ceramic capacitor shown in FIG. 1, and FIG. 5 is a schematic perspective view of a laminate chip as a precursor of a laminate constituting a portion of the element body portion shown in FIG. 4. In the following, prior to a description of a method and a device for manufacturing a capacitor element in accordance with the present embodiment, a laminated ceramic capacitor manufactured using the method and the device for manufacturing the capacitor element will be described with reference to FIGS. 1 to 5.

As shown in FIGS. 1 to 3, a laminated ceramic capacitor 10 is an electronic component having a shape of a substantially rectangular parallelepiped as a whole, and includes an element body portion 11 and a pair of external electrodes 16.

As shown in FIGS. 1 and 2, the pair of external electrodes 16 is provided to be spaced from each other to cover external surfaces of element body portion 11 at both end portions in a predetermined direction. Each of the pair of external electrodes 16 is made of a conductive film.

More specifically, the pair of external electrodes 16 is made of, for example, a laminated film of a sintered metal layer and a plating layer. The sintered metal layer is formed by, for example, burning a paste of Cu, Ni, Ag, Pd, an Ag—Pd alloy, Au, or the like. The plating layer is composed of, for example, an Ni plating layer and an Sn plating layer covering the Ni plating layer. Alternatively, the plating layer may be a Cu plating layer or an Au plating layer. Further, the pair of external electrodes 16 may be made of a plating layer only.

Moreover, a conductive resin paste can also be used as the pair of external electrodes 16. When a conductive resin paste is used as the pair of external electrodes 16, a resin component contained in the conductive resin paste exhibits the effect of absorbing vibrations generated in element body portion 11 by a piezoelectric effect, and thus the pair of external electrodes 16 can effectively attenuate vibrations propagating from element body portion 11 to the outside, and is advantageous for reducing noise.

As shown in FIGS. 1 to 4, element body portion 11 includes a laminate 12 including dielectric layers 13 and internal electrode layers 14 laminated alternately along a predetermined direction, and a pair of additional dielectric layers 15 covering predetermined portions of laminate 12.

Dielectric layer 13 and additional dielectric layer 15 are made of, for example, a ceramic material containing barium titanate as a main component. Further, dielectric layer 13 and additional dielectric layer 15 may contain a Mn compound, a Mg compound, a Si compound, a Co compound, a Ni compound, a rare earth compound, or the like as an accessory component of ceramic powder serving as a raw material for a ceramic green sheet described later. On the other hand, internal electrode layer 14 is preferably made of a metal material represented by, for example, Ni, Cu, Ag, Pd, an Ag—Pd alloy, Au, or the like, and is particularly preferably made of Ni as a ferromagnetic material.

As shown in FIG. 2, one of a pair of internal electrode layers 14 which are adjacent to each other along a lamination direction with dielectric layer 13 sandwiched therebetween is electrically connected to one of the pair of external electrodes 16 within laminated ceramic capacitor 10, and the other of the pair of internal electrode layers 14 which are adjacent to each other along the lamination direction with dielectric layer 13 sandwiched therebetween is electrically connected to the other of the pair of external electrodes 16 within laminated ceramic capacitor 10. Thereby, a portion between the pair of external electrodes 16 has a structure in which a plurality of capacitor components are electrically connected in parallel.

It is noted that the material for dielectric layer 13 and additional dielectric layer 15 is not limited to the ceramic material containing barium titanate as a main component described above, and another ceramic material having a high dielectric constant (for example, a ceramic material containing $CaTiO_3$, $SrTiO_3$, $CaZrO_3$, or the like as a main component) may be selected as the material for dielectric layer 13 and additional dielectric layer 15. Further, it is not necessarily required to use the same material for dielectric layer 13 and additional dielectric layer 15, and ceramic materials having different main components may be used as materials for dielectric layer 13 and additional dielectric layer 15. Furthermore, as additional dielectric layer 15, a resin material which is a non-ceramic material may also be used. On the other hand, the material for internal electrode layer 14 is not limited to the metal material described above, either, and another conductive material may be selected as the material for internal electrode layer 14.

Here, referring to FIGS. 1 to 3, as terms indicating directions of laminated ceramic capacitor 10, a direction in which the pair of external electrodes 16 is arranged side by side is defined as a length direction L, the lamination direction of dielectric layers 13 and internal electrode layers 14 is defined as a thickness direction T, and a direction which is perpendicular to both of length direction L and thickness direction T is defined as a width direction W, of laminated ceramic capacitor 10. These terms will be used in the description below.

Further, of six external surfaces of laminated ceramic capacitor 10 having the shape of a substantially rectangular parallelepiped, a pair of external surfaces located opposite to each other in length direction L is defined as end surfaces 10a, a pair of external surfaces located opposite to each other in thickness direction T is defined as main surfaces 10b, and a pair of external surfaces located opposite to each other in width direction W is defined as side surfaces 10c. These terms will be used in the description below.

In addition, referring to FIGS. 4 and 5, a pair of external surfaces of element body portion 11 and a pair of external surfaces of a laminate chip 22 corresponding to the pair of end surfaces 10a of laminated ceramic capacitor 10 are defined as end surfaces 11a and end surfaces 22a, respectively, a pair of external surfaces of element body portion 11 and a pair of external surfaces of laminate chip 22 corresponding to the pair of main surfaces 10b of laminated ceramic capacitor 10 are defined as main surfaces 11b and main surfaces 22b, respectively, and a pair of external surfaces of element body portion 11 and a pair of external surfaces of laminate chip 22 corresponding to the pair of side surfaces 10c of laminated ceramic capacitor 10 are defined as side surfaces 11c and side surfaces 22c, respectively. These terms will be used in the description below.

It is noted that, as shown in FIGS. 1 to 3, laminated ceramic capacitor 10 in accordance with the present embodiment has a shape of an elongated, substantially rectangular parallelepiped formed such that an external dimension along length direction L is longest. Examples of representative values of an external dimension of laminated ceramic capacitor 10 in length direction L and an external dimension thereof in width direction W (generally, an external dimension thereof in thickness direction T is set to be equal to the external dimension thereof in width direction W) include 3.2 mm×1.6 mm, 2.0 mm×1.25 mm, 1.6 mm×0.8 mm, 1.0 mm×0.5 mm, 0.8 mm×0.4 mm, 0.6 mm×0.3 mm, 0.4 mm×0.2 mm, and the like.

As shown in FIG. 4, the pair of additional dielectric layers 15 covers a pair of external surfaces of laminate 12 located opposite to each other in width direction W, to constitute the pair of side surfaces 11c of element body portion 11. On the other hand, the pair of end surfaces 11a of element body portion 11 is mainly constituted of a pair of external surfaces of laminate 12 located opposite to each other in length direction L, and the pair of main surfaces 11b of element body portion 11 is mainly constituted of a pair of external surfaces of laminate 12 located opposite to each other in thickness direction T.

As shown in FIG. 5, laminate chip 22 as a precursor of laminate 12 is formed to have a shape of a substantially rectangular parallelepiped as shown, by laminating a plurality of material sheets each having a conductive pattern 24 which will serve as internal electrode layer 14 printed on a surface of a lamination ceramic green sheet 23 which will serve as dielectric layer 13, and cutting the plurality of material sheets.

At each of the pair of end surfaces 22a of laminate chip 22, some of conductive patterns 24 arranged in a laminated state are selectively exposed. More specifically, at each of the pair of end surfaces 22a of laminate chip 22, end portions of conductive patterns 24 on one side in length direction L, which are to be connected to external electrode 16 formed to cover end surface 22a, are exposed. On the other hand, at each of the pair of side surfaces 22c of laminate chip 22, end portions in width direction W of all of conductive patterns 24 arranged in a laminated state are exposed.

On each of the pair of side surfaces 22c of laminate chip 22, a covering ceramic green sheet is attached to cover side surface 22c correspondingly. Thereby, the end portions in width direction W of conductive patterns 24 exposed at each of the pair of side surfaces 22c of laminate chip 22 described above are covered with the covering ceramic green sheet. Further, laminate chip 22 with the covering ceramic green sheets attached thereto is subjected to thermal compression bonding and burning, and thereby element body portion 11 as shown in FIG. 4 is fabricated.

In the laminated ceramic capacitor 10 described above, since dielectric layers at portions located at both end portions of element body portion 11 in the width direction W are made of the covering ceramic green sheets which are attached to cover the pair of external surfaces of laminate 12 located opposite to each other in width direction W, and which will serve as additional dielectric layers 15 after burning, the thickness of the dielectric layers at portions forming side surfaces 10c of laminated ceramic capacitor 10 can be reduced by sufficiently reducing the thickness of the covering ceramic green sheets to be attached. Accordingly, by adopting such a structure, an effective area can be increased by increasing the size of internal electrode layers 14 along the width direction W with respect to a physical size thereof, and thus a laminated ceramic capacitor having a smaller size and a larger capacity when compared with a conventional one can be achieved.

Figure 6:
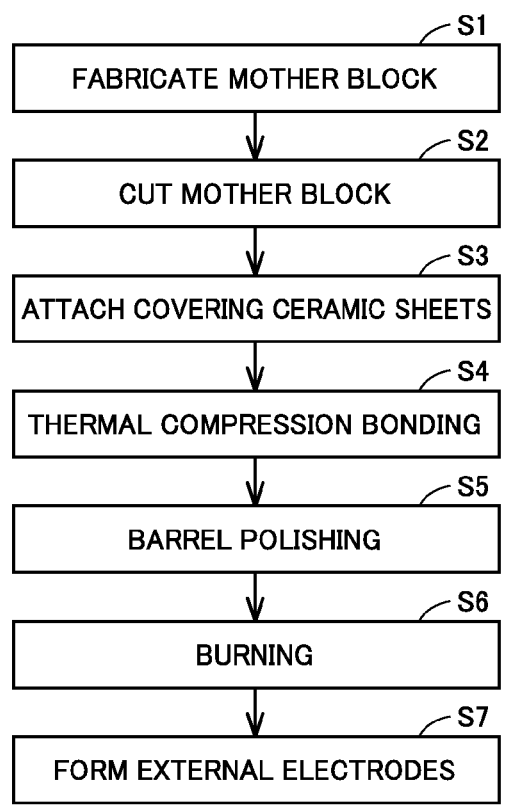
FIG. 6 is a flowchart schematically illustrating the method for manufacturing the capacitor element in accordance with the embodiment of the present disclosure.
Figure 7:
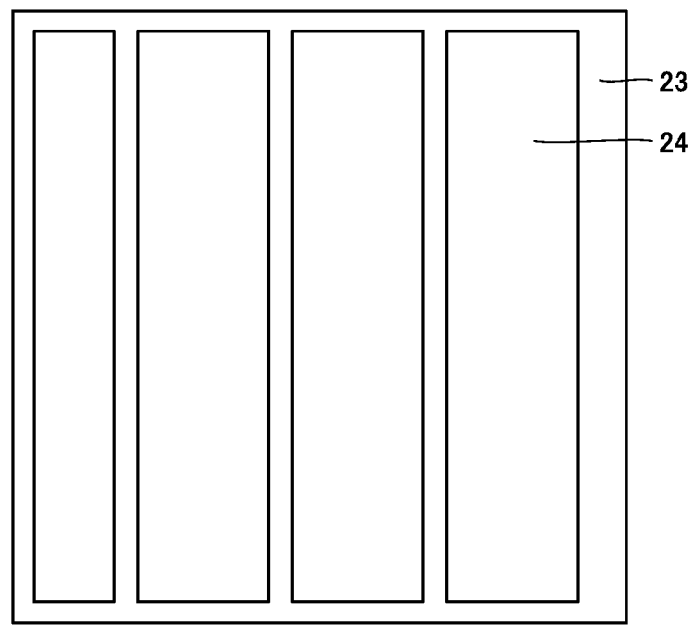
FIG. 7 is a schematic plan view of a ceramic green sheet used in the step of fabricating a mother block.
Figure 8:
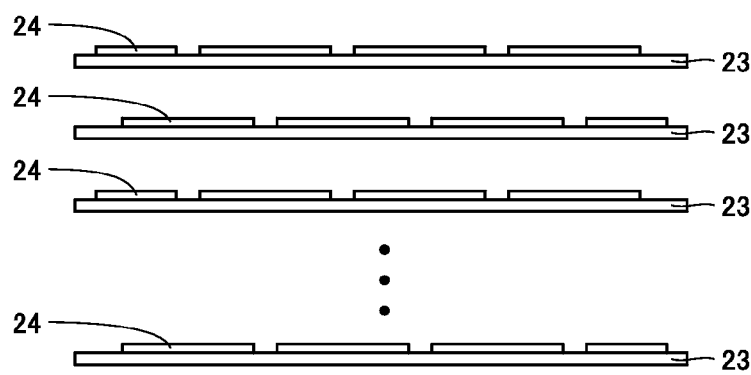
FIG. 8 is a schematic view showing a laminated state of ceramic green sheets in the step of fabricating the mother block.
Figure 9:
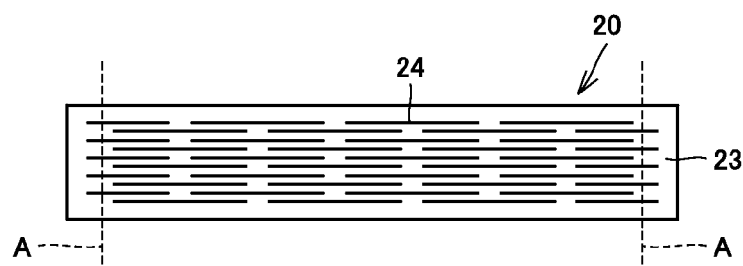
FIG. 9 is a schematic side view of the mother block.
Figure 10:
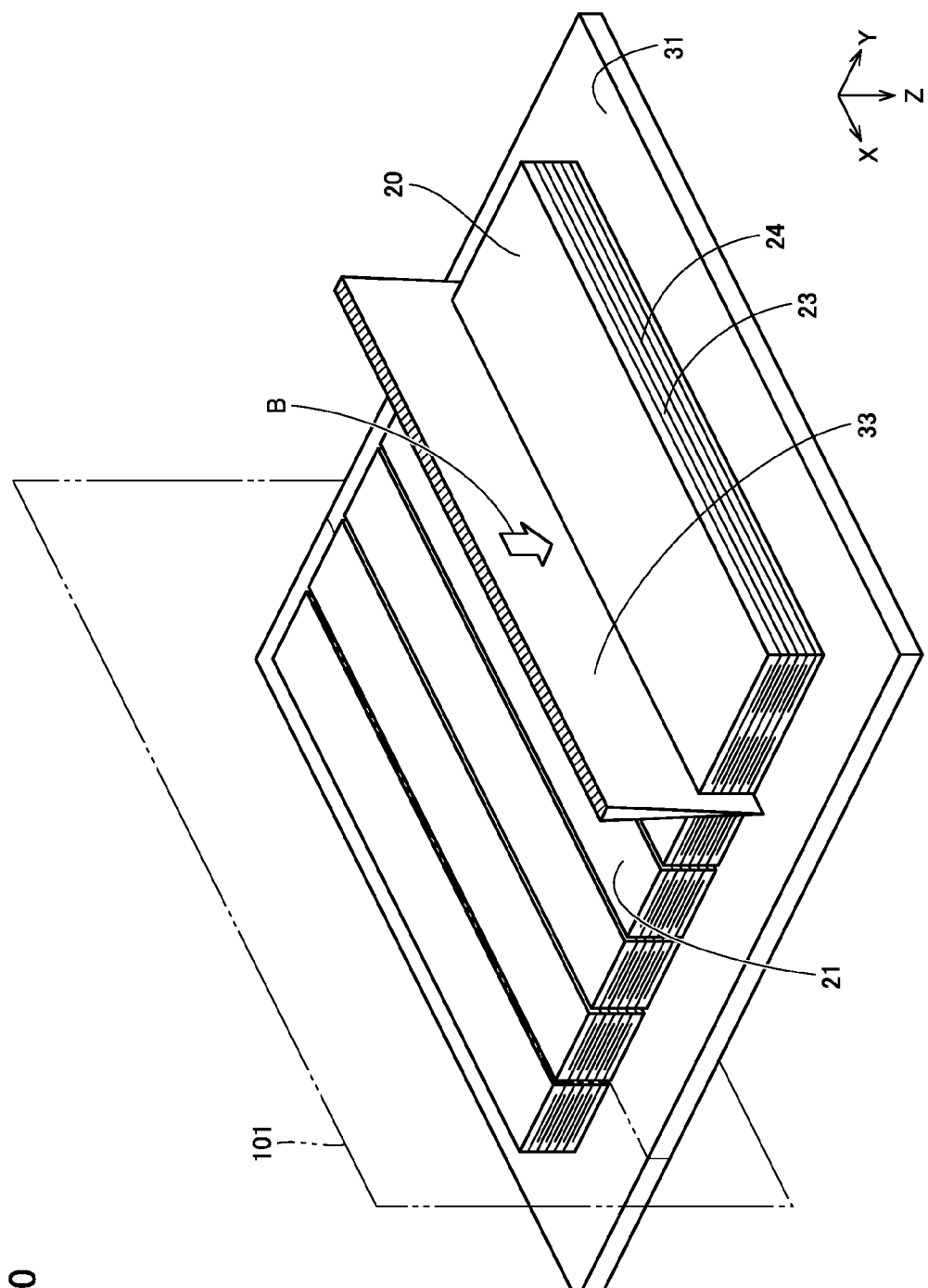
FIG. 10 is a schematic view showing a first dividing step.
Figure 11:
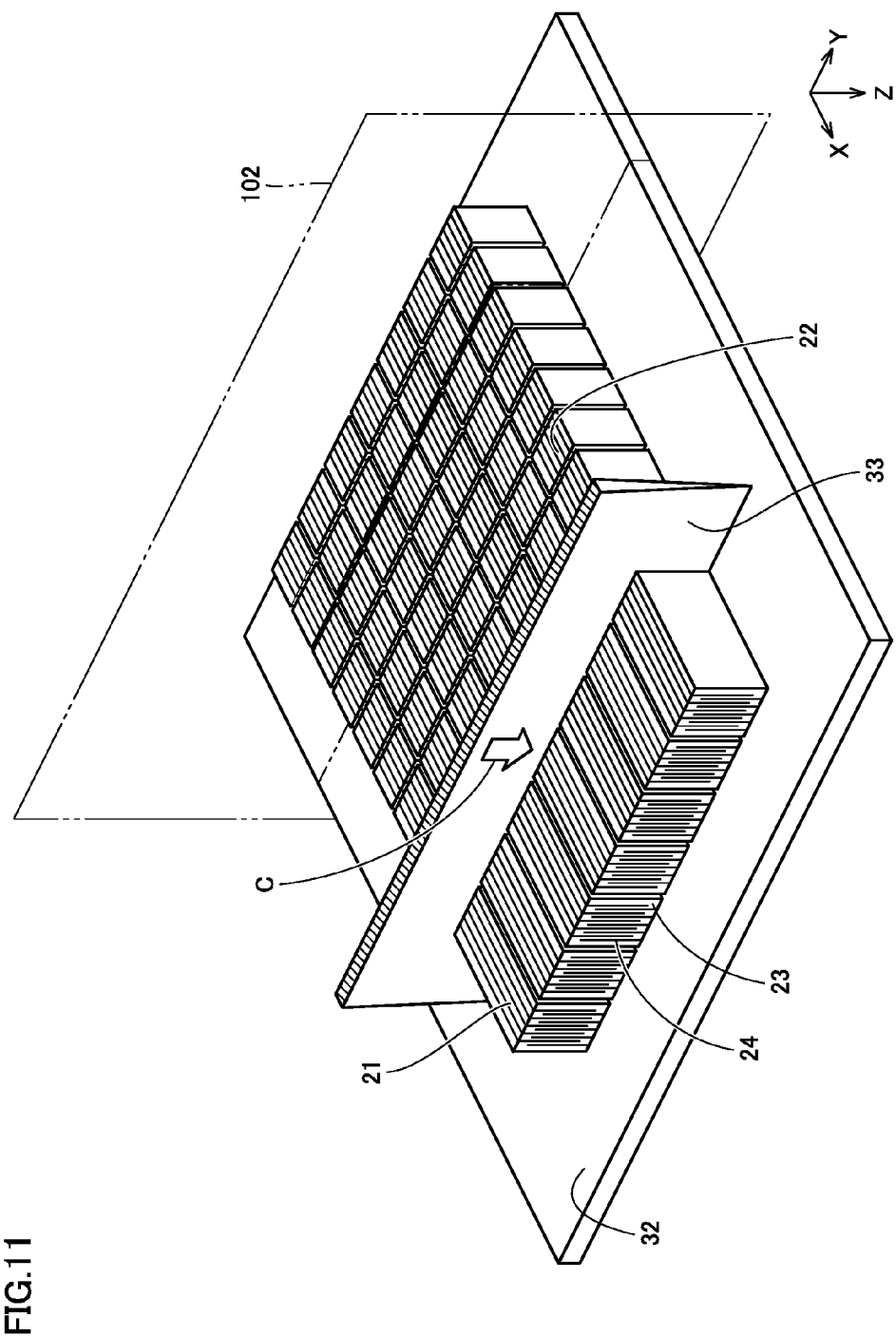
FIG. 11 is a schematic view showing a second dividing step.

FIG. 6 is a flowchart schematically illustrating the method for manufacturing the capacitor element in accordance with the present embodiment. FIGS. 7 to 9 specifically describe the step of fabricating a mother block shown in FIG. 6, in which FIG. 7 is a schematic plan view of a ceramic green sheet used in the step of fabricating the mother block, FIG. 8 is a schematic view showing a laminated state of ceramic green sheets in the step of fabricating the mother block, and FIG. 9 is a schematic side view of the mother block. Further, FIGS. 10 and 11 specifically describe the step of dividing the mother block shown in FIG. 6, in which FIG. 10 is a schematic view showing a first dividing step, and FIG. 11 is a schematic view showing a second dividing step. Next, referring to FIGS. 6 to 11, first, the method for manufacturing the capacitor element in accordance with the present embodiment will be schematically described.

The method for manufacturing the capacitor element in accordance with the present embodiment fabricates a component material (mother block) serving as a core of a laminated ceramic capacitor, as one block, by performing the processing treatment collectively up to a partway stage in a manufacturing process, thereafter dividing the component material to be singulated, and mass-producing a plurality of laminated ceramic capacitors at the same time by further performing processing treatment on the singulated component material (laminate chips).

As shown in FIG. 6, the method for manufacturing the capacitor element in accordance with the present embodiment mainly includes, in order, the step of fabricating a mother block (step S1), the step of cutting the mother block (step S2), the step of attaching covering ceramic green sheets (step S3), the step of performing thermal compression bonding (step S4), the step of performing barrel polishing (step S5), the step of performing burning (step S6), and the step of forming external electrodes (step S7).

In the step of fabricating a mother block (step S1) shown in FIG. 6, first, ceramic slurry containing ceramic powder, a binder, and a solvent is prepared, and the ceramic slurry is molded into a sheet on a carrier film, using a die coater, a gravure coater, a micro gravure coater, or the like, to fabricate a ceramic green sheet. Preferably, the thickness of the ceramic green sheet is set to be equal to or less than 1.5 μm, from the viewpoint of downsizing and capacity increase of laminated ceramic capacitor 10.

Next, a conductive paste is printed on the ceramic green sheet to have a band-like pattern, by screen printing, ink jet printing, gravure printing, or the like, to form a conductive pattern. Preferably, the thickness of the conductive pattern is set to be equal to or less than 1.5 μm, from the viewpoint of downsizing and capacity increase of laminated ceramic capacitor 10.

Thereby, as shown in FIG. 7, a material sheet having conductive pattern 24 which will serve as internal electrode layer 14 printed on the surface of lamination ceramic green sheet 23 which will serve as dielectric layer 13 is prepared.

Next, as shown in FIG. 8, a plurality of the material sheets are laminated in accordance with a predetermined rule. Specifically, the plurality of material sheets are laminated such that band-like conductive patterns 24 formed on lamination ceramic green sheets 23 are oriented in the same direction, and band-like conductive patterns 24 are shifted by half a pitch in the width direction between adjacent material sheets.

Next, the laminated plurality of material sheets are subjected to thermal compression bonding to form a structural body as shown in FIG. 9, and outer peripheral portions of the formed structural body are cut along cut lines A shown in the drawing and removed to fabricate a mother block 20. Thereby, mother block 20 has an external shape of a flattened, substantially rectangular parallelepiped, and has a structure in which a plurality of lamination ceramic green sheets 23 which will serve as dielectric layers 13 and a plurality of conductive patterns 24 which will serve as internal electrode layers 14 are laminated. Further, mother block 20 has a structure in which some of conductive patterns 24 are exposed at each of four peripheral end surfaces thereof.

The step of cutting the mother block (step S2) shown in FIG. 6 includes, in order, the step of attaching the mother block to a first holding adhesive sheet, a first dividing step of dividing the mother block to be singulated into a plurality of laminate blocks having a shape of an elongated, substantially rectangular parallelepiped, the step of detaching the singulated plurality of laminate blocks from the first holding adhesive sheet and rolling them, the step of attaching the plurality of laminate blocks after rolling to a second holding adhesive sheet, and a second dividing step of dividing each of the plurality of laminate blocks to be singulated into laminate chips having a shape of a substantially rectangular parallelepiped.

First, in the step of attaching the mother block to the first holding adhesive sheet, a first holding adhesive sheet 31 (see FIG. 10) is attached to one of a pair of main surfaces of prepared mother block 20. Thereby, mother block 20 is held by first holding adhesive sheet 31. Here, as first holding adhesive sheet 31, various types of sheets having adhesiveness can be used, and, for example, a foamed peelable sheet whose adhesiveness is lowered by heating can be suitably used.

Next, in the first dividing step, as shown in FIG. 10, mother block 20 held by first holding adhesive sheet 31 is divided in rows along a first dividing plane 101 (XZ plane) which is parallel to an extending direction of the plurality of band-like conductive patterns 24 (an X axis direction shown in the drawing) and is parallel to a lamination direction of the plurality of conductive patterns 24 (a Z axis direction shown in the drawing). For the dividing, push cutting using a push-cutting blade, dicing using a dicer, or the like can be used, and here a case where push cutting is performed using a push-cutting blade 33 is illustrated.

More specifically, at the time of the above dividing, push-cutting blade 33 is arranged along the extending direction of band-like conductive patterns 24 (the X axis direction shown in the drawing), and push-cutting blade 33 is caused to penetrate into mother block 20 along first dividing plane 101 (XZ plane), toward a direction parallel to the lamination direction of the plurality of conductive patterns 24 (the Z axis direction shown in the drawing) (i.e., a direction indicated by an arrow B shown in the drawing), to cut one laminate block 21 out of mother block 20. Further, at the time of the above dividing, push-cutting blade 33 is relatively moved by a predetermined pitch along a direction perpendicular to the extending direction of band-like conductive patterns 24 (a Y axis direction shown in the drawing), and push cutting is performed each time, to singulate mother block 20 into a plurality of laminate blocks 21.

Thereby, each of the plurality of laminate blocks 21 obtained by undergoing the first dividing step has an external shape of an elongated, substantially rectangular parallelepiped, and includes a pair of first cut surfaces which is parallel to the extending direction of the plurality of band-like conductive patterns 24 (the X axis direction shown in the drawing) and is parallel to the lamination direction of the plurality of conductive patterns 24 (the Z axis direction shown in the drawing), as some of the external surfaces thereof.

Next, in the step of detaching the singulated plurality of laminate blocks from the first holding adhesive sheet and rolling them, each of the plurality of laminate blocks 21 is rotated 90° about an axis line thereof, using a rolling device 40 (see FIG. 12 and the like) as a device for manufacturing the capacitor element in accordance with the present embodiment described later. It is noted that details of this step and details of rolling device 40 will be described later.

Next, in the step of attaching the plurality of laminate blocks after rolling to the second holding adhesive sheet, a second holding adhesive sheet 32 (see FIG. 11) is attached to one of the first cut surfaces of each of laminate blocks 21 gathered along the lamination direction of the plurality of conductive patterns 24 in the plurality of laminate blocks 21 after rolling (the Y axis direction shown in the drawing). Thereby, each of the plurality of laminate blocks 21 is held by second holding adhesive sheet 32. Here, as second holding adhesive sheet 32, various types of sheets having adhesiveness can be used, and, for example, a foamed peelable sheet whose adhesiveness is lowered by heating can be suitably used.

Next, in the second dividing step, as shown in FIG. 11, the plurality of laminate blocks 21 held by second holding adhesive sheet 32 are collectively divided in columns along a second dividing plane 102 (YZ plane) which is parallel to the lamination direction of the plurality of conductive patterns 24 in the plurality of laminate blocks 21 after rolling (the Y axis direction shown in the drawing) and is parallel to a direction perpendicular to the pair of first cut surfaces formed in each laminate block 21 in the first dividing step (the Z axis direction shown in the drawing). For the dividing, push cutting using push-cutting blade 33 is used.

More specifically, at the time of the above dividing, push-cutting blade 33 is arranged along the lamination direction of the plurality of conductive patterns 24 in the plurality of laminate blocks 21 after rolling (the Y axis direction shown in the drawing), and push-cutting blade 33 is caused to penetrate into the plurality of laminate blocks 21 along second dividing plane 102 (YZ plane), toward a direction parallel to the direction perpendicular to the pair of first cut surfaces formed in each laminate block 21 in the first dividing step (the Z axis direction shown in the drawing) (i.e., a direction indicated by an arrow C shown in the drawing), to cut one laminate chip 22 out of each of the plurality of laminate blocks 21. Further, at the time of the above dividing, push-cutting blade 33 is relatively moved by a predetermined pitch along a direction parallel to the extending direction of band-like conductive patterns 24 (the X axis direction shown in the drawing), and push cutting is performed each time, to singulate each of the plurality of laminate blocks 21 into a plurality of laminate chips 22.

Thereby, each of the plurality of laminate chips 22 obtained by undergoing the second dividing step has an external shape of a substantially rectangular parallelepiped as shown in FIG. 5, and includes, in addition to the pair of first cut surfaces described above (the pair of first cut surfaces correspond to the pair of end surfaces 22a shown in FIG. 5), a pair of second cut surfaces which is parallel to the lamination direction of the plurality of conductive patterns 24 in the plurality of laminate blocks 21 after rolling (the Y axis direction shown in the drawing) and is parallel to the direction perpendicular to the pair of first cut surfaces formed in each laminate block 21 in the first dividing step (the Z axis direction shown in the drawing) (the pair of second cut surfaces correspond to the pair of side surfaces 22c shown in FIG. 5), as some of external surfaces thereof.

It is noted that, since push cutting is performed by causing push-cutting blade 33 to penetrate into laminate blocks 21 along a direction parallel to a lamination direction of lamination ceramic green sheets 23 in the second dividing step, a shear force caused by push cutting can be suppressed from being applied to lamination ceramic green sheets 23 and conductive patterns 24 along the lamination direction. Therefore, peeling-off at an end portion of lamination ceramic green sheet 23 or contact between conductive patterns 24 at the cut surface can be prevented, which results in an improved yield and an improved reliability.

In the step of attaching covering ceramic green sheets (step S3) shown in FIG. 6, covering ceramic green sheets are attached to the pair of second cut surfaces of each laminate chip 22 exposed in the second dividing step described above. Here, as the covering ceramic green sheet, a molded sheet made of ceramic slurry containing ceramic powder, a binder, and a solvent is used, as with lamination ceramic green sheet 23 described above.

Specifically, a covering ceramic green sheet formed to be sufficiently thin and having a main surface larger than the second cut surface of laminate chip 22 is prepared and placed on an elastic body, and one of the second cut surfaces of laminate chip 22 is pressed against the covering ceramic green sheet placed on the elastic body to punch out the covering ceramic green sheet, and further a remaining portion is torn off from the punched-out portion of the covering ceramic green sheet. Thereby, the covering ceramic green sheet is attached to one of the pair of second cut surfaces of laminate chip 22. It is noted that, by performing the above process on each of the pair of second cut surfaces of laminate chip 22, each of the pair of second cut surfaces of laminate chip 22 is covered with the covering ceramic green sheet.

In the step of performing thermal compression bonding (step S4) shown in FIG. 6, thermal compression bonding treatment is performed by placing each laminate chip 22 having the covering ceramic green sheets attached thereto described above into a state where it is heated to a predetermined temperature, and pressing exposed surfaces of the covering ceramic green sheets against laminate chip 22 in that state, using an elastic body or the like. Thereby, the adhesion property of the covering ceramic green sheets to laminate chip 22 is improved.

In the step of performing barrel polishing (step S5) shown in FIG. 6, polishing treatment is performed by enclosing laminate chips 22 subjected to the thermal compression bonding described above (including the covering ceramic green sheets attached to each laminate chip 22) within a small box called a barrel, together with media balls having a hardness higher than that of the ceramic material, and rotating the barrel. Thereby, external surfaces of each laminate chip 22 and the covering ceramic green sheets (in particular, edge portions and corner portions) are rounded to have curved surfaces.

In the step of performing burning (step S6) shown in FIG. 6, burning treatment of the ceramic material is performed by heating laminate chips 22 subjected to the barrel polishing (including the covering ceramic green sheets attached to each laminate chip 22) to a predetermined temperature. By this treatment, each laminate chip 22 becomes element body portion 11 shown in FIG. 2.

In the step of forming external electrodes (step S7) shown in FIG. 6, the pair of external electrodes 16 is formed by applying a conductive paste on the pair of end surfaces 11a of element body portion 11 to form metal layers, baking the formed metal layers, and thereafter plating the baked metal layers with Ni and Sn in order.

By undergoing a series of steps described above, manufacturing of laminated ceramic capacitor 10 having a structure shown in FIGS. 1 to 3 is completed.

Figure 12:
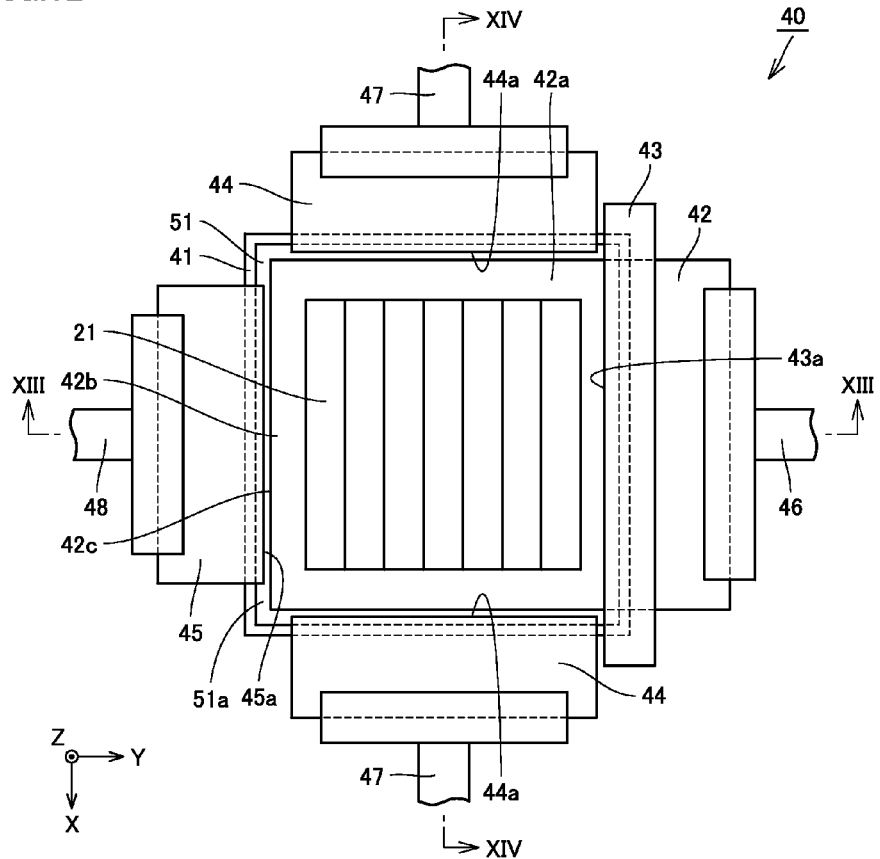
FIG. 12 is a schematic plan view of a rolling device as a device for manufacturing the capacitor element in accordance with the embodiment of the present disclosure.
Figure 13:
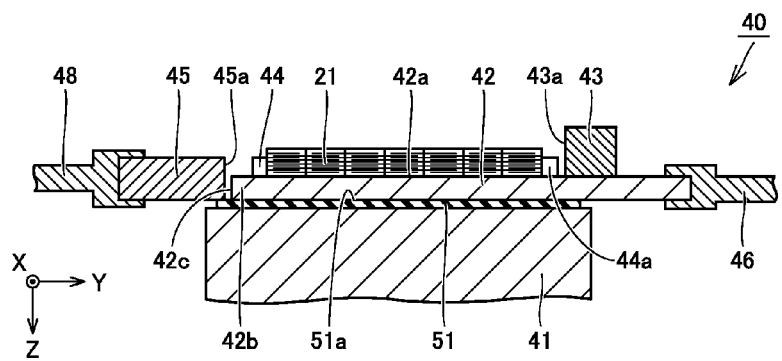
FIG. 13 is a schematic cross sectional view of the rolling device shown in FIG. 12 taken along a line XIII-XIII shown in FIG. 12.
Figure 14:
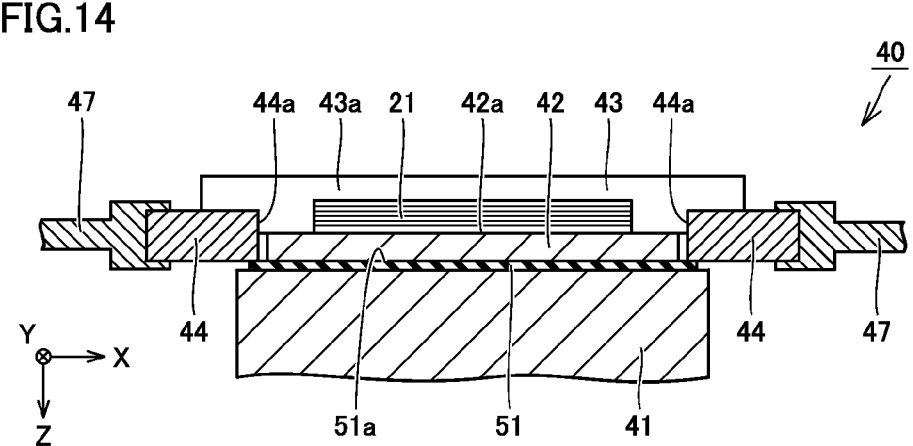
FIG. 14 is a schematic cross sectional view of the rolling device shown in FIG. 12 taken along a line XIV-XIV shown in FIG. 12.
Figure 15:
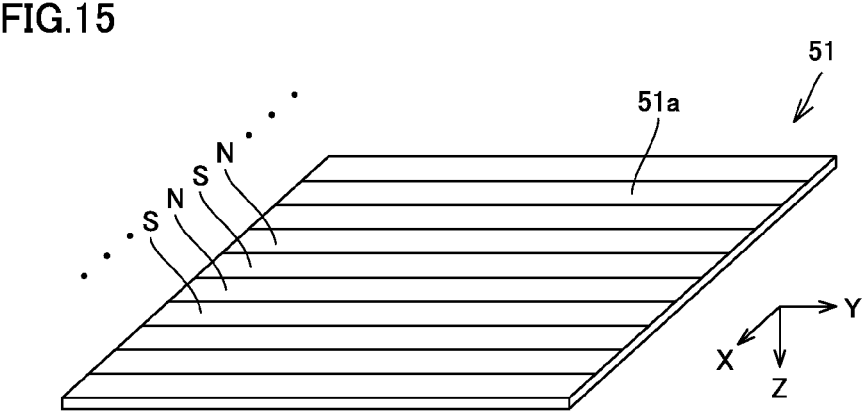
FIG. 15 is a schematic view of a magnet sheet used in the rolling device shown in FIG. 12.

FIG. 12 is a schematic plan view of a rolling device as a device for manufacturing the capacitor element in accordance with the embodiment of the present disclosure. FIGS. 13 and 14 are schematic cross sectional views of the rolling device shown in FIG. 12 taken along lines XIII-XIII and XIV-XIV, respectively, shown in FIG. 12. Further, FIG. 15 is a schematic view of a magnet sheet used in the rolling device shown in FIG. 12. Next, details of the rolling device as the device for manufacturing the capacitor element in accordance with the present embodiment will be described with reference to FIGS. 12 to 15.

The rolling device as the device for manufacturing the capacitor element in accordance with the present embodiment described below is suitably used in the step of detaching the singulated plurality of laminate blocks from the first holding adhesive sheet and rolling them in the method for manufacturing the capacitor element in accordance with the present embodiment described above, in order to rotate each of the plurality of laminate blocks 21 90° about the axis line thereof.

As shown in FIGS. 12 to 14, rolling device 40 mainly includes a table 41, a stage 42, a movement restriction member 43, a pair of centering guide members 44, a gathering guide member 45, and a stage driving mechanism (not shown). Of them, movement restriction member 43 and the stage driving mechanism (not shown) correspond to a rolling mechanism for rolling each laminate block 21.

Stage 42 has one end held by a stage holder 46, and thereby is arranged to be located above table 41 at a predetermined distance from table 41. Stage 42 is arranged to cover almost all over an upper surface of table 41 having a substantially rectangular shape as seen in a plan view. Stage 42 has a placement surface 42a at an upper surface thereof, and the plurality of laminate blocks 21, before rolling, are placed on placement surface 42a.

Stage 42 is configured to be movable along the Y axis direction shown in the drawing by being driven by the stage driving mechanism (not shown) described above, via stage holder 46. Thereby, stage 42 is relatively movable with respect to table 41. Further, stage 42 also serves as a gathering guide member which forms a pair with gathering guide member 45 described later, and an end surface constituting an end portion 42b of stage 42 located on the gathering guide member 45 side serves as a gathering guide surface 42c.

Movement restriction member 43 is arranged to be located on placement surface 42a of stage 42. Movement restriction member 43 is arranged along one side of table 41 having a substantially rectangular shape as seen in a plan view, and extends along the X axis direction shown in the drawing. Movement restriction member 43 is fixed so as not to be relatively movable with respect to table 41. Further, movement restriction member 43 has an abutment surface 43a on the placement surface 42a side of stage 42.

Each of the pair of centering guide members 44 has one end held by a centering guide member holder 47, and thereby is arranged to be located above table 41 at a predetermined distance from table 41. Each of the pair of centering guide members 44 is arranged along one side of table 41 having a substantially rectangular shape as seen in a plan view, and extends along the Y axis direction shown in the drawing. Thereby, the pair of centering guide members 44 is located to sandwich stage 42 at a portion located above table 41, along the X axis direction.

Each of the pair of centering guide members 44 is configured to be movable along the X axis direction shown in the drawing by being driven by a centering guide member driving mechanism not shown, via centering guide member holder 47. Thereby, each centering guide member 44 is relatively movable with respect to table 41. Further, each of the pair of centering guide members 44 has a centering guide surface 44a on the stage 42 side.

Gathering guide member 45 has one end held by a gathering guide member holder 48, and thereby is arranged to be located above table 41 at a predetermined distance from table 41. Gathering guide member 45 is arranged along one side of table 41 having a substantially rectangular shape as seen in a plan view, and extends along the X axis direction shown in the drawing. Thereby, gathering guide member 45 is located to face stage 42 along the Y axis direction shown in the drawing.

Gathering guide member 45 is configured to be movable along the Y axis direction shown in the drawing by being driven by a gathering guide member driving mechanism not shown, via gathering guide member holder 48. Thereby, gathering guide member 45 is relatively movable with respect to table 41. Further, gathering guide member 45 has a gathering guide surface 45a on the stage 42 side.

On table 41, a magnet sheet 51 is placed to cover almost all over the upper surface thereof. Magnet sheet 51 in a state placed on table 41 is arranged below stage 42, the pair of centering guide members 44, and gathering guide member 45. Magnet sheet 51 has a landing surface 51a on which the plurality of laminate blocks 21 after rolling are to be placed, at a main surface thereof. As shown in FIG. 15, as magnet sheet 51, a magnet sheet in which magnetic poles having different polarities (i.e., N poles and S poles) are alternately arranged along the X axis direction shown in the drawing can be suitably used.

FIGS. 16(A) through 16(E) are schematic views showing the steps of rolling the laminate blocks. Further, FIG. 17 is a schematic view showing a state where a laminate block is held by the magnet sheet after the step of rolling the laminate blocks. Next, details of the step of detaching the singulated plurality of laminate blocks from the first holding adhesive sheet and rolling them in the method for manufacturing the capacitor element in accordance with the present embodiment described above will be described with reference to FIGS. 16(A) through 16(E) and 17.

In the step of detaching the singulated plurality of laminate blocks from the first holding adhesive sheet and rolling them, as shown in FIGS. 12 to 14 and 16(A), first, the plurality of laminate blocks 21 obtained by undergoing the first dividing step described above are placed on placement surface 42a of stage 42 of rolling device 40 such that each of a pair of first cut surfaces 21a1, 21a2 remains to face a laminate block located adjacent thereto.

More specifically, by placing the plurality of laminate blocks 21 held by first holding adhesive sheet 31 on placement surface 42a of stage 42, being upside down together with first holding adhesive sheet 31, and detaching first holding adhesive sheet 31 from the plurality of laminate blocks 21, the plurality of laminate blocks 21 are placed on stage 42 in an aligned state as described above.

In that state, the plurality of laminate blocks 21 are arranged such that the axis lines of the plurality of laminate blocks 21 are located along the X axis direction shown in the drawing. Thereby, first cut surface 21a1, which is one of the pair of first cut surfaces of each of the plurality of laminate blocks 21, faces a side on which gathering guide member 45 is located, and first cut surface 21a2, which is the other of the pair of first cut surfaces of each of the plurality of laminate blocks 21, faces a side on which movement restriction member 43 is located.

Figure 16A:
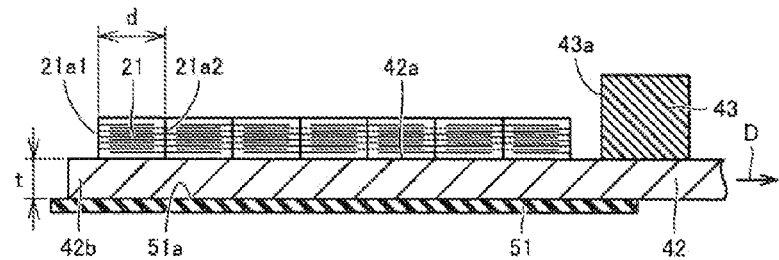
FIGS. 16(A) through 16(E) are schematic views showing the step of rolling laminate blocks.
Figure 16B:
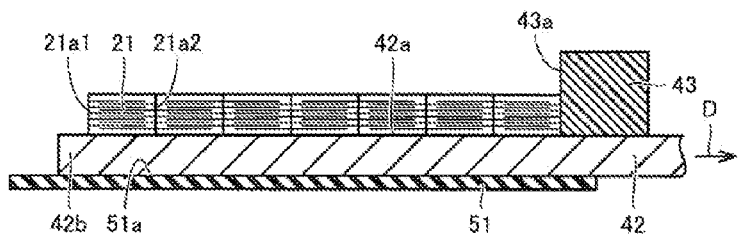
Figure 17:
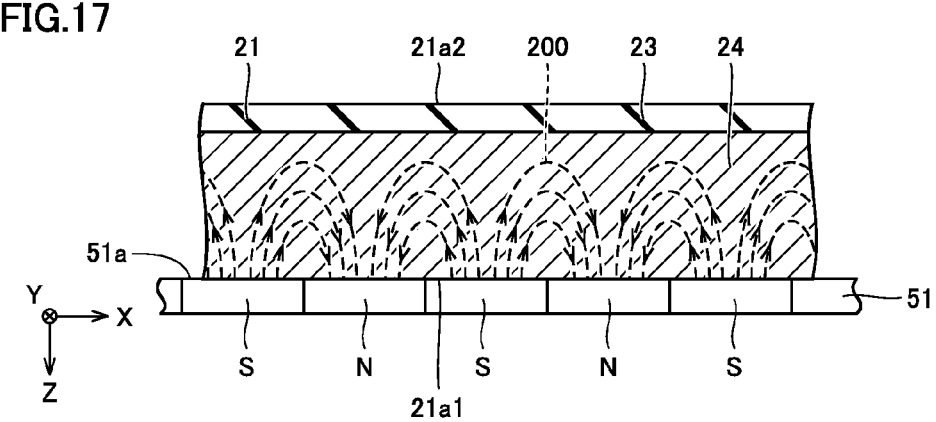
FIG. 17 is a schematic view showing a state where a laminate block is held by the magnet sheet after the step of rolling the laminate blocks.

As shown in FIG. 16(A), next, movement of stage 42 toward a direction indicated by an arrow D shown in the drawing is started by driving stage 42 by the stage driving mechanism described above. Thereby, as shown in FIG. 16(B), all of the plurality of laminate blocks 21 placed on stage 42 are moved together with stage 42 along the direction indicated by arrow D shown in the drawing. Thereafter, one of laminate blocks 21 which is arranged at a position closest to movement restriction member 43 abuts on abutment surface 43a of movement restriction member 43, and thereby movement of all laminate blocks 21 is stopped. It is noted that, even when the plurality of laminate blocks 21 are placed on stage 42 to be spaced from each other, movement of all laminate blocks 21 is stopped by adjacent laminate blocks abutting on each other by the above operation.

Figure 16C:
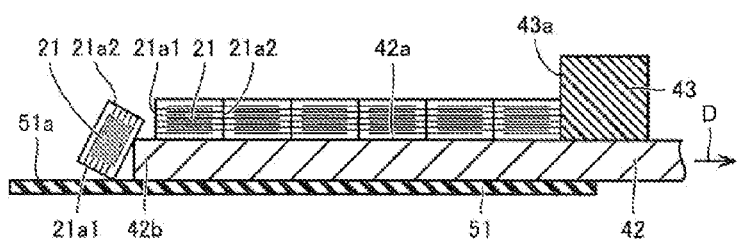

As shown in FIG. 16(B), as the movement of stage 42 toward the direction indicated by arrow D shown in the drawing is further continued, the plurality of laminate blocks 21 are relatively moved on stage 42, with respect to stage 42, along a direction in which they are arranged side by side (the Y axis direction in the drawing). Thereby, as shown in FIG. 16(C), one of the plurality of laminate blocks 21 which is located at a position farthest from movement restriction member 43 is pushed to end portion 42b of stage 42.

Laminate block 21 pushed to end portion 42b of stage 42 loses support therefor and falls from end portion 42b of stage 42 toward a region outside stage 42. On this occasion, since it is possible to cause laminate block 21 to rotationally fall about end portion 42b of stage 42 by appropriately adjusting a moving speed of stage 42, first cut surface 21a1 of laminate block 21 is oriented vertically downward at the time of the falling. Accordingly, laminate block 21 which has rotationally fallen lands on magnet sheet 51 such that its first cut surface 21a1 comes into contact with landing surface 51a of magnet sheet 51, and thus a state where laminate block 21 is rotated 90° about an axis line thereof can be achieved.

It is noted that, preferably, the moving speed of stage 42 described above is 1 mm/second to 50 mm/second. This is because, if the moving speed is less than 1 mm/second, productivity is considerably decreased, and if the moving speed is more than 50 mm/second, laminate block 21 does not have a stable attitude.

Here, in order to cause laminate block 21 to reliably land on magnet sheet 51 with first cut surface 21a1 being in contact with landing surface 51a, it is preferable that a distance d between the pair of first cut surfaces 21a1, 21a2 of laminate block 21 (see FIG. 16(A)) and a thickness t of stage 42 (see FIG. 16(A)) satisfy a condition of $d/2 \leq t \leq d$. By providing a configuration to satisfy this condition, first cut surface 21a1 achieves a state where it faces landing surface 51a more vertically when laminate block 21 rotationally falls from end portion 42b of stage 42, and the center of gravity of laminate block 21 can be prevented from being deviated in the Y axis direction in that state. Therefore, the state where laminate block 21 is rotated 90° about the axis line thereof can be achieved more reliably.

Further, by arranging magnet sheet 51 beforehand in the region outside stage 42 as described above, laminate block 21 after rotational falling can be magnetically attracted and stably held by attraction by magnet sheet 51 as shown in FIG. 17. That is, since laminate block 21 includes conductive patterns 24 made of a ferromagnetic material, magnet sheet 51 magnetically attracts conductive patterns 24 in laminate block 21, and thereby laminate block 21 after rotational falling is held by attraction by magnet sheet 51. Here, since some of conductive patterns 24 are exposed at first cut surface 21a1 of laminate block 21, laminate block 21 can be held by attraction more stably also in this respect.

Further, when a magnet sheet in which magnetic poles having different polarities are alternately arranged along an extending direction of each of the plurality of laminate blocks 21 placed on stage 42 (the X axis direction shown in the drawing) is used as magnet sheet 51 as described above, a situation where lines of magnetic force 200 are produced in a direction perpendicular to landing surface 51a of magnet sheet 51 can be created. Therefore, the extending direction of conductive patterns 24 in laminate block 21 in the state rotated 90° about the axis line can be matched with the direction of lines of magnetic force 200 (i.e., the extending direction of conductive patterns 24 is the X axis direction and the Z axis direction, a plane in which lines of magnetic force 200 are formed is the XZ plane, and they match with each other), and the state where laminate block 21 is rotated 90° about the axis line can also be stably maintained.

It is noted that, as magnet sheet 51, a magnet sheet in which magnetic poles having different polarities are alternately arranged along the direction in which the plurality of laminate blocks 21 placed on stage 42 are arranged side by side (the Y axis direction shown in the drawing) may also be used. Also in this case, a situation where lines of magnetic force 200 are produced in the direction perpendicular to landing surface 51a of magnet sheet 51 can be created, and thus the state where laminate block 21 is rotated 90° about the axis line can be maintained stably to a respectable degree.

Figure 16D:
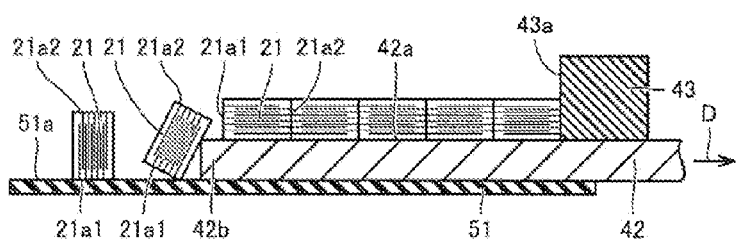

As the movement of stage 42 toward the direction indicated by arrow D shown in the drawing is further continued as shown in FIG. 16(C), the plurality of laminate blocks 21 placed on stage 42 are sequentially pushed to end portion 42b of stage 42 and rotationally fall from end portion 42b, from the one arranged at the position farthest from movement restriction member 43, as shown in FIG. 16(D), and thereby the plurality of laminate blocks 21 are sequentially held by attraction on magnet sheet 51 in the state where they are each rotated 90° about the axis line.

Figure 16E:
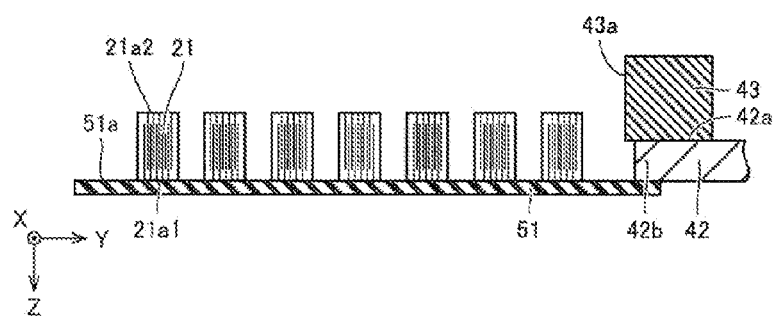

As a result, as shown in FIG. 16(E), when end portion 42b of stage 42 reaches movement restriction member 43, all laminate blocks 21 have rotationally fallen from end portion 42b of stage 42 and are held by attraction by magnet sheet 51. Thereby, a state where all laminate blocks 21 are rolled and rotated 90° about the axis lines thereof from the state shown in FIG. 16(A) can be achieved. Thus, the step of rolling the plurality of laminate blocks 21 is completed.

It is noted that, although the above description has described the case where only stage 42 is moved, not only stage 42 but also magnet sheet 51 may be moved. In that case, the moving direction of magnet sheet 51 can be set to a direction identical to or opposite to the moving direction of stage 42. When the moving direction of magnet sheet 51 is set to the direction identical to the moving direction of stage 42, the interval between laminate blocks 21 after rotational falling can be decreased by setting the moving speed of magnet sheet 51 to be slower than the moving speed of stage 42, and when the moving direction of magnet sheet 51 is set to the direction opposite to the moving direction of stage 42, the interval between laminate blocks 21 after rotational falling can be increased. In this manner, the interval between laminate blocks 21 after rotational falling can be arbitrarily adjusted by appropriately adjusting the moving direction and the moving speed of magnet sheet 51.

Further, although the above description has described the case where magnet sheet 51 is used to magnetically attract laminate blocks 21, a magnetic field generation device including an electromagnet can be used instead of magnet sheet 51 to magnetically attract laminate blocks 21.

Figure 18:
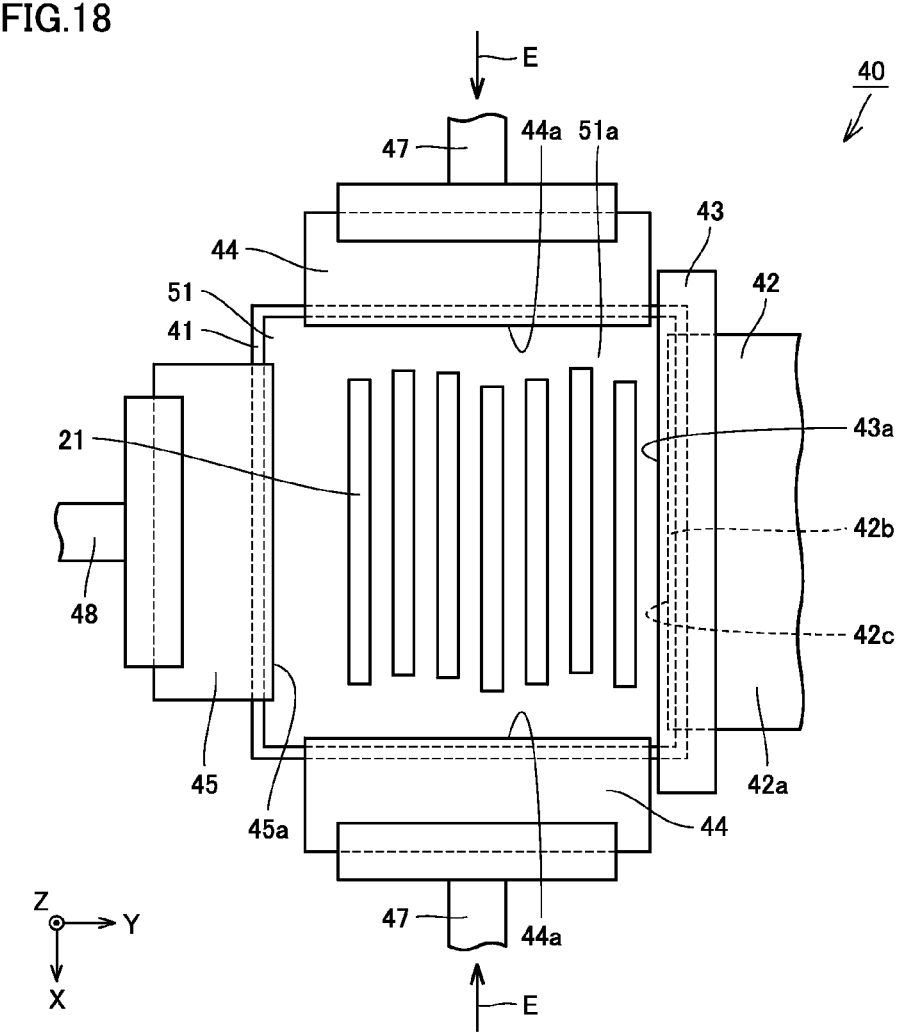
FIG. 18 is a schematic plan view showing a state of the rolling device after the step of rolling the laminate blocks.
Figure 19:
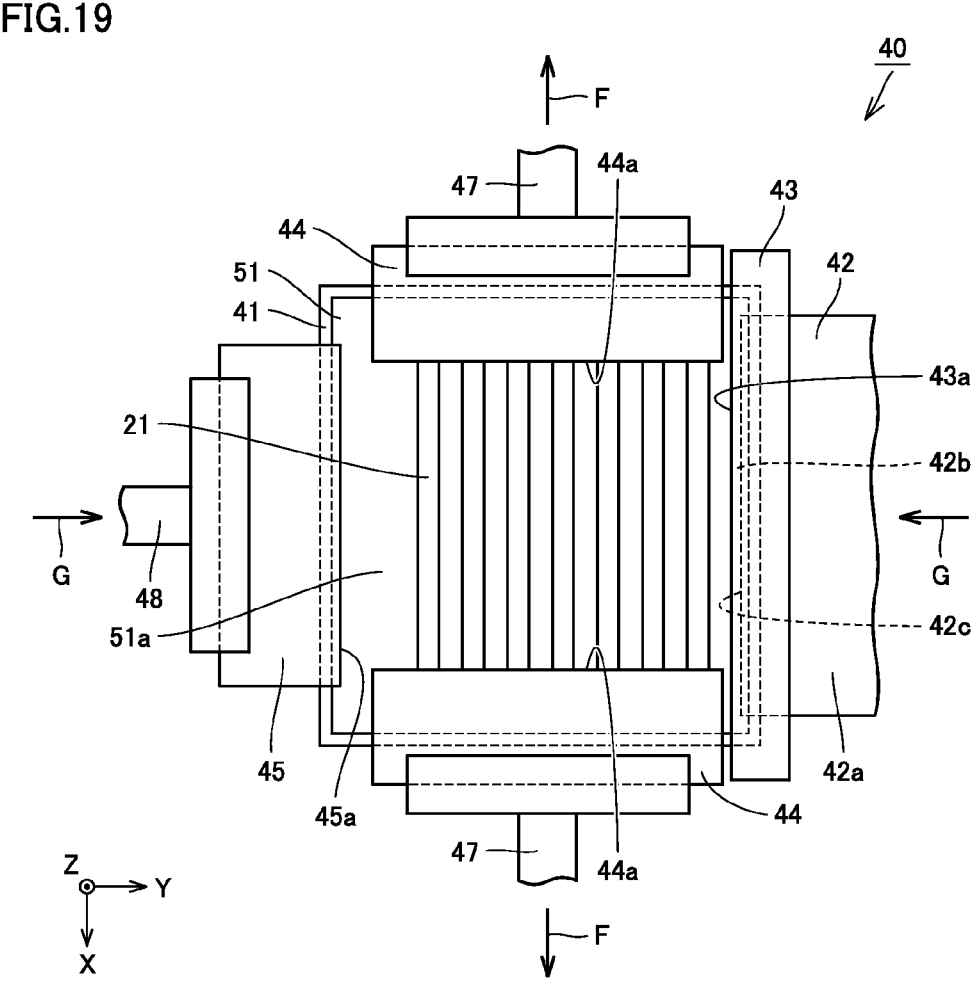
FIG. 19 is a schematic plan view of the rolling device showing the step of centering the laminate blocks.
Figure 20:
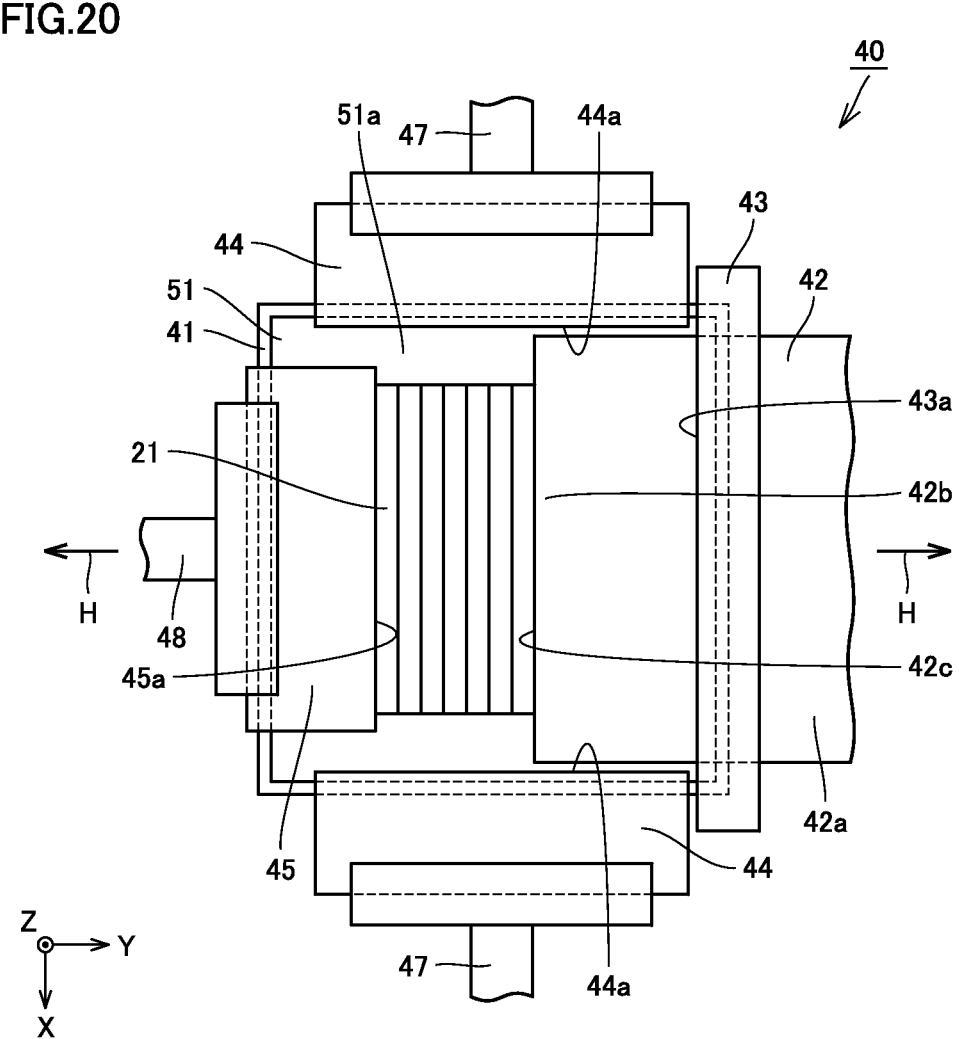
FIG. 20 is a schematic plan view of the rolling device showing the step of gathering the laminate blocks.
Figure 21:
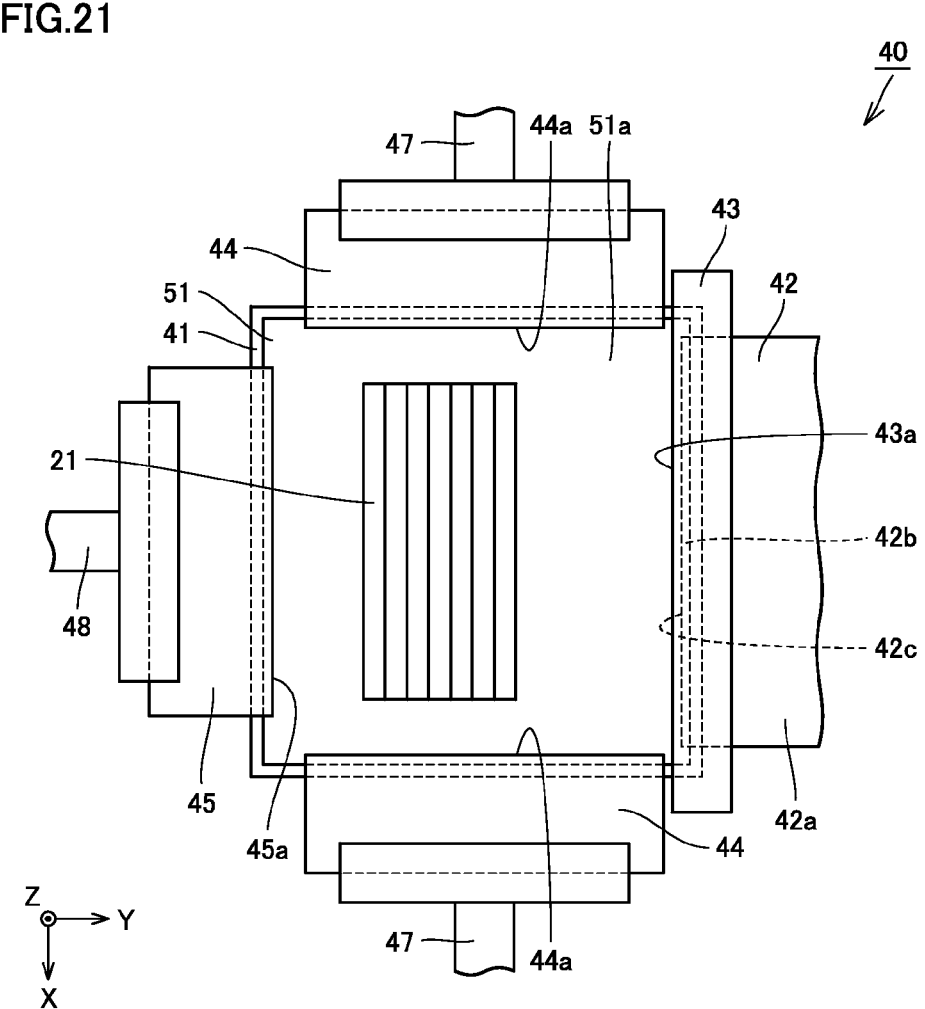
FIG. 21 is a schematic plan view showing a state of the rolling device after the step of gathering the laminate blocks.

FIG. 18 is a schematic plan view showing a state of the rolling device after the step of rolling the laminate blocks. FIG. 19 is a schematic plan view of the rolling device showing the step of centering the laminate blocks. Further, FIG. 20 is a schematic plan view of the rolling device showing the step of gathering the laminate blocks, and FIG. 21 is a schematic plan view showing a state of the rolling device after the step of gathering the laminate blocks.

As shown in FIG. 18, after the plurality of laminate blocks 21 are rolled, the plurality of laminate blocks 21 are located to be spaced from each other in the direction in which they are arranged side by side (the Y axis direction in the drawing), and, in some cases, the plurality of laminate blocks 21 may be in a state where their locations are not aligned along a longitudinal direction thereof (the X axis direction in the drawing), as shown.

In such a state, positions for dividing individual laminate blocks to be divided in the second dividing step described above are not aligned, and the laminate blocks cannot directly proceed to the second dividing step. Therefore, the method for manufacturing the capacitor element in accordance with the present embodiment includes the step of centering the laminate blocks (i.e., the step of aligning positions for dividing individual laminate blocks) and the step of gathering the laminate blocks. These steps can be performed in rolling device 40 as the device for manufacturing the capacitor element in accordance with the present embodiment described above. In the following, details of these steps will be described with reference to FIGS. 18 to 21.

First, in the step of centering the laminate blocks, as shown in FIG. 18, the pair of centering guide members 44 is moved toward directions indicated by arrows E in the drawing, by being driven by the centering guide member driving mechanism described above. Thereby, centering guide surfaces 44a provided to the pair of centering guide members 44 come into contact with end portions of each of the plurality of laminate blocks 21 in the longitudinal direction, and accordingly, the plurality of laminate blocks 21 are moved along the X axis direction shown in the drawing.

Thereafter, as shown in FIG. 19, movement of the pair of centering guide members 44 is stopped when the distance between the pair of centering guide members 44 becomes equal to the length of the plurality of laminate blocks 21 in the longitudinal direction. Thereby, the plurality of laminate blocks 21 are sandwiched between the pair of centering guide members 44 along the longitudinal direction thereof, and accordingly, the plurality of laminate blocks 21 are centered collectively in the longitudinal direction thereof (X axis direction shown in the drawing).

It is noted that, after centering, the pair of centering guide members 44 moves away from the plurality of laminate blocks 21 by moving from the state shown in FIG. 19 toward directions indicated by arrows F in the drawing.

Next, in the step of gathering the laminate blocks, as shown in FIG. 19, stage 42 also serving as a gathering guide member and gathering guide member 45 are moved toward directions indicated by arrows G in the drawing, by being driven by the stage driving mechanism and the gathering guide member driving mechanism described above, respectively. Thereby, gathering guide surface 42*c* provided to stage 42 and gathering guide surface 45*a* provided to gathering guide member 45 each come into contact with laminate block 21 which is closest thereto, and accordingly, the plurality of laminate blocks 21 are moved along the Y axis direction shown in the drawing.

Thereafter, as shown in FIG. 20, movement of stage 42 and gathering guide member 45 is stopped when the distance between stage 42 and gathering guide member 45 becomes equal to widths of the plurality of laminate blocks 21 in a horizontal direction in a state where they are gathered. Thereby, the plurality of laminate blocks 21 are sandwiched between stage 42 and gathering guide member 45 along the direction in which they are arranged side by side, and accordingly, the plurality of laminate blocks 21 are gathered collectively in the direction in which they are arranged side by side (Y axis direction shown in the drawing).

It is noted that, after gathering, stage 42 and gathering guide member 45 move away from the plurality of laminate blocks 21 by moving from the state shown in FIG. 20 toward directions indicated by arrows H in the drawing, and a state shown in FIG. 21 is achieved.

Next, in the state shown in FIG. 21, second holding adhesive sheet 32 (see FIG. 11) is attached to upper surfaces of the gathered plurality of laminate blocks 21 (i.e., each first cut surface 21*a*2 not held by magnet sheet 51, of the pair of first cut surfaces (see FIG. 16(E)), and thereby the plurality of laminate blocks 21 are transferred from magnet sheet 51 to second holding adhesive sheet 32. Then, the second dividing step described above is performed on the plurality of laminate blocks 21, after rolling, which are held by second holding adhesive sheet 32.

By using the method and the device for manufacturing the capacitor element in accordance with the present embodiment described above, the plurality of laminate blocks 21 can be collectively rotated 90° very easily and with good handling ability, prior to dividing each of the plurality of laminate blocks 21 having a shape of an elongated, substantially rectangular parallelepiped, which have been singulated by dividing mother block 20 in the first dividing step, into laminate chips 22 having a shape of a substantially rectangular parallelepiped in the second dividing step. Further, since the plurality of laminate blocks 21 can be rolled without or almost without manual work, reliable rolling, shortened working time, prevention of damage of workpieces, and the like can also be achieved, rolling can be performed very efficiently and with a good yield, and as a result manufacturing cost can be considerably reduced. These effects are particularly exhibited significantly when laminate blocks 21 are small in size, and are very suitable for manufacturing a laminated ceramic capacitor having a smaller size and a larger capacity.

Further, by using the method and the device for manufacturing the capacitor element in accordance with the present embodiment, as described above, push cutting can be performed by causing push-cutting blade 33 to penetrate into laminate blocks 21 along the direction parallel to the lamination direction of lamination ceramic green sheets 23 in the second dividing step, and thus a shear force caused by push cutting can be suppressed from being applied to lamination ceramic green sheets 23 and conductive patterns 24 along the lamination direction, and an improved yield and an improved reliability can be achieved.

Therefore, by adopting the method and the device for manufacturing the capacitor element in accordance with the present embodiment, a laminated ceramic capacitor having a smaller size, a larger capacity, and a higher reliability can be efficiently manufactured with a good yield.

Although the present embodiment described above has described the case where the additional dielectric layer is formed by attaching a ceramic sheet to the cut surface corresponding to the side surface of the laminate chip, the additional dielectric layer may be formed by applying ceramic slurry or a resin paste to the cut surface, instead of attaching a ceramic sheet.

Further, although the present embodiment described above has described the case where both the first dividing step and the second dividing step are configured to divide the mother block and the plurality of laminate blocks such that some of the conductive patterns are exposed at a cut surface, these steps are not necessarily configured as such, and cutting may be performed such that the conductive patterns are not exposed at a cut surface in one or both of these steps.

Further, although the present embodiment described above has described the case where the plurality of laminate blocks are divided in the second dividing step using push cutting, the plurality of laminate blocks may be divided in the second dividing step using dicing.

That is, the present disclosure is not limited to be applied to a method and a device for manufacturing a capacitor element in a case where dividing is performed such that conductive patterns are exposed at a cut surface corresponding to a side surface of a laminate chip and the cut surface is additionally covered with a dielectric material in order to increase an effective area, but is also naturally applicable to other common methods and devices for manufacturing a capacitor element.

Further, although the present embodiment described above has described the case where the magnet sheet is arranged beforehand on the table of the rolling device, another sheet such as an adhesive sheet may be arranged instead of the magnet sheet, or no sheet may be arranged. That is, the desired object is achieved as long as the plurality of laminate blocks are sequentially caused to rotationally fall from the end portion of the stage and land on the region outside the stage.

Furthermore, although the present embodiment described above has described the case where the rolling mechanism is constituted of the stage driving mechanism and the movement restriction member, and the plurality of laminate blocks placed on the stage are configured to be sequentially pushed to the end portion of the stage and caused to rotationally fall, by moving the stage with the movement restriction member being fixed so as not to be movable, the rolling mechanism may instead be constituted of a stage fixed so as not to be movable and a pushing member moving on the stage, and the plurality of laminate blocks placed on the stage may be configured to be sequentially pushed to the end portion of the stage and caused to rotationally fall, by moving the pushing member on the stage.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A method for manufacturing a capacitor element having an element body portion including dielectric layers and internal electrode layers laminated alternately along a predetermined direction, comprising the steps of:

preparing a mother block formed by laminating a plurality of dielectric green sheets which will serve as said dielectric layers and a plurality of conductive patterns which will serve as said internal electrode layers;

singulating said mother block into a plurality of laminate blocks having a shape of an elongated, substantially rectangular parallelepiped, by dividing said mother block in rows along a first dividing plane which is substantially parallel to a lamination direction of said plurality of conductive patterns;

rolling each of said plurality of laminate blocks such that each of a pair of first cut surfaces does not face a laminate block located adjacent thereto, said pair of first cut surfaces being formed in each of said plurality of laminate blocks by dividing said mother block in the step of singulating said mother block into said plurality of laminate blocks; and singulating each of said plurality of laminate blocks into a plurality of laminate chips having a shape of a substantially rectangular parallelepiped, by dividing said plurality of laminate blocks after rolling in columns along a second dividing plane which is substantially parallel to the lamination direction of said plurality of conductive patterns in said plurality of laminate blocks after rolling, and is substantially perpendicular to said pair of first cut surfaces, wherein the step of rolling each of said plurality of laminate blocks includes the steps of placing said plurality of laminate blocks on a stage such that each of said pair of first cut surfaces remains to face the laminate block located adjacent thereto, and relatively moving, on said stage, said plurality of laminate blocks placed thereon, with respect to the stage, along a direction in which the plurality of laminate blocks are arranged side by side, thereby sequentially pushing each of said plurality of laminate blocks to an end portion of said stage and causing each of said plurality of laminate blocks to rotationally fall from the end portion, and thereby causing one of said pair of first cut surfaces of each of said plurality of laminate blocks which have rotationally fallen to land in a region outside said stage, wherein said plurality of conductive patterns are made of a ferromagnetic material, and in the step of rolling each of said plurality of laminate blocks, said plurality of laminate blocks after rotational falling are magnetically attracted and held by attraction by a magnet sheet, by arranging said magnet sheet beforehand in the region outside said stage.

2. The method for manufacturing the capacitor element according to claim 1, wherein, in the step of singulating each of said plurality of laminate blocks into said plurality of laminate chips, said plurality of laminate blocks are collectively divided by causing a push-cutting blade to penetrate into said plurality of laminate blocks along said second dividing plane, toward a direction perpendicular to the lamination direction of said plurality of conductive patterns in said plurality of laminate blocks after rotational falling.

3. The method for manufacturing the capacitor element according to claim 1, wherein, when t is a thickness of said stage, and d is a distance between said pair of first cut surfaces of each of said plurality of laminate blocks, a stage having said thickness t which satisfies a condition of $d/2 \leq t \leq d$ is used as said stage.

4. The method for manufacturing the capacitor element according to claim 1, wherein said magnet sheet is a sheet in which magnetic poles having different polarities are alternately arranged in a direction parallel to an extending direction of each of said plurality of laminate blocks placed on said stage is used.

5. The method for manufacturing the capacitor element according to claim 1, wherein, in the step of singulating said mother block into said plurality of laminate blocks, said mother block is divided such that said plurality of conductive patterns are exposed at each of said pair of first cut surfaces.

6. The method for manufacturing the capacitor element according to claim 1, wherein, in the step of singulating each of said plurality of laminate blocks into said plurality of laminate chips, each of said plurality of laminate blocks is divided such that said plurality of conductive patterns are exposed at each of a pair of second cut surfaces formed in each of said plurality of laminate chips by dividing each of said plurality of laminate blocks.

7. The method for manufacturing the capacitor element according to claim 6, further comprising the step of covering each of said pair of second cut surfaces of each of said plurality of laminate chips with a dielectric material.

8. A method for manufacturing a capacitor element having an element body portion including dielectric layers and internal electrode layers laminated alternately along a predetermined direction, comprising the steps of:

preparing a mother block formed by laminating a plurality of dielectric green sheets which will serve as said dielectric layers and a plurality of conductive patterns which will serve as said internal electrode layers;

singulating said mother block into a plurality of laminate blocks having a shape of an elongated, substantially rectangular parallelepiped, by dividing said mother block in rows along a first dividing plane which is substantially parallel to a lamination direction of said plurality of conductive patterns;

rolling each of said plurality of laminate blocks such that each of a pair of first cut surfaces does not face a laminate block located adjacent thereto, said pair of first cut surfaces being formed in each of said plurality of laminate blocks by dividing said mother block in the step of singulating said mother block into said plurality of laminate blocks; and singulating each of said plurality of laminate blocks into a plurality of laminate chips having a shape of a substantially rectangular parallelepiped, by dividing said plurality of laminate blocks after rolling in columns along a second dividing plane which is substantially parallel to the lamination direction of said plurality of conductive patterns in said plurality of laminate blocks after rolling, and is substantially perpendicular to said pair of first cut surfaces, wherein the step of rolling each of said plurality of laminate blocks includes the steps of placing said plurality of laminate blocks on a stage such that each of said pair of first cut surfaces remains to face the laminate block located adjacent thereto, and relatively moving, on said stage, said plurality of laminate blocks placed thereon, with respect to the stage, along a direction in which the plurality of laminate blocks are arranged side by side, thereby sequentially pushing each of said plurality of laminate blocks to an end portion of said stage and causing each of said plurality of laminate blocks to rotationally fall from the end portion, and thereby causing one of said pair of first cut surfaces of each of said plurality of laminate blocks which have rotationally fallen to land in a region outside said stage, and further comprising the step of centering said plurality of laminate blocks collectively in a longitudinal direction thereof, by sandwiching said plurality of laminate blocks after rotational falling collectively, along said longitudinal direction, between a pair of centering guide members, after the step of rolling each of said plurality of laminate blocks and before the step of singulating each of said plurality of laminate blocks into said plurality of laminate chips.

9. A method for manufacturing a capacitor element having an element body portion including dielectric layers and internal electrode layers laminated alternately along a predetermined direction, comprising the steps of:

preparing a mother block formed by laminating a plurality of dielectric green sheets which will serve as said dielectric layers and a plurality of conductive patterns which will serve as said internal electrode layers;

singulating said mother block into a plurality of laminate blocks having a shape of an elongated, substantially rectangular parallelepiped, by dividing said mother block in rows along a first dividing plane which is substantially parallel to a lamination direction of said plurality of conductive patterns;

rolling each of said plurality of laminate blocks such that each of a pair of first cut surfaces does not face a laminate block located adjacent thereto, said pair of first cut surfaces being formed in each of said plurality of laminate blocks by dividing said mother block in the step of singulating said mother block into said plurality of laminate blocks; and singulating each of said plurality of laminate blocks into a plurality of laminate chips having a shape of a substantially rectangular parallelepiped, by dividing said plurality of laminate blocks after rolling in columns along a second dividing plane which is substantially parallel to the lamination direction of said plurality of conductive patterns in said plurality of laminate blocks after rolling, and is substantially perpendicular to said pair of first cut surfaces, wherein the step of rolling each of said plurality of laminate blocks includes the steps of placing said plurality of laminate blocks on a stage such that each of said pair of first cut surfaces remains to face the laminate block located adjacent thereto, and relatively moving, on said stage, said plurality of laminate blocks placed thereon, with respect to the stage, along a direction in which the plurality of laminate blocks are arranged side by side, thereby sequentially pushing each of said plurality of laminate blocks to an end portion of said stage and causing each of said plurality of laminate blocks to rotationally fall from the end portion, and thereby causing one of said pair of first cut surfaces of each of said plurality of laminate blocks which have rotationally fallen to land in a region outside said stage, and further comprising the step of gathering said plurality of laminate blocks collectively in the direction in which the plurality of laminate blocks are arranged side by side, by sandwiching said plurality of laminate blocks after rotational falling collectively, along said direction, between a pair of gathering guide members, after the step of rolling each of said plurality of laminate blocks and before the step of singulating each of said plurality of laminate blocks into said plurality of laminate chips.

10. The method for manufacturing the capacitor element according to claim 8, wherein, in the step of singulating each of said plurality of laminate blocks into said plurality of laminate chips, said plurality of laminate blocks are collectively divided by causing a push-cutting blade to penetrate into said plurality of laminate blocks along said second dividing plane, toward a direction perpendicular to the lamination direction of said plurality of conductive patterns in said plurality of laminate blocks after rotational falling.

11. The method for manufacturing the capacitor element according to claim 8, wherein, when t is a thickness of said stage, and d is a distance between said pair of first cut surfaces of each of said plurality of laminate blocks, a stage having said thickness t which satisfies a condition of $d/2 \leq t \leq d$ is used as said stage.

12. The method for manufacturing the capacitor element according to claim 8, wherein said plurality of conductive patterns are made of a ferromagnetic material, and in the step of rolling each of said plurality of laminate blocks, said plurality of laminate blocks after rotational falling are magnetically attracted and held by attraction by a magnet sheet, by arranging said magnet sheet beforehand in the region outside said stage.

13. The method for manufacturing the capacitor element according to claim 8, wherein, in the step of singulating each of said plurality of laminate blocks into said plurality of laminate chips, each of said plurality of laminate blocks is divided such that said plurality of conductive patterns are exposed at each of a pair of second cut surfaces formed in each of said plurality of laminate chips by dividing each of said plurality of laminate blocks.

14. The method for manufacturing the capacitor element according to claim 13, further comprising the step of covering each of said pair of second cut surfaces of each of said plurality of laminate chips with a dielectric material.

15. The method for manufacturing the capacitor element according to claim 8, further comprising the step of gathering said plurality of laminate blocks collectively in the direction in which the plurality of laminate blocks are arranged side by side, by sandwiching said plurality of laminate blocks after rotational falling collectively, along said direction, between a pair of gathering guide members, after the step of rolling each of said plurality of laminate blocks and before the step of singulating each of said plurality of laminate blocks into said plurality of laminate chips.

16. The method for manufacturing the capacitor element according to claim 9, wherein, in the step of singulating each of said plurality of laminate blocks into said plurality of laminate chips, said plurality of laminate blocks are collectively divided by causing a push-cutting blade to penetrate into said plurality of laminate blocks along said second dividing plane, toward a direction perpendicular to the lamination direction of said plurality of conductive patterns in said plurality of laminate blocks after rotational falling.

17. The method for manufacturing the capacitor element according to claim 9, wherein, when t is a thickness of said stage, and d is a distance between said pair of first cut surfaces of each of said plurality of laminate blocks, a stage having said thickness t which satisfies a condition of $d/2 \leq t \leq d$ is used as said stage.

18. The method for manufacturing the capacitor element according to claim 9, wherein said plurality of conductive patterns are made of a ferromagnetic material, and in the step of rolling each of said plurality of laminate blocks, said plurality of laminate blocks after rotational falling are magnetically attracted and held by attraction by a magnet sheet, by arranging said magnet sheet beforehand in the region outside said stage.

19. The method for manufacturing the capacitor element according to claim 9, wherein, in the step of singulating each of said plurality of laminate blocks into said plurality of laminate chips, each of said plurality of laminate blocks is divided such that said plurality of conductive patterns are exposed at each of a pair of second cut surfaces formed in each of said plurality of laminate chips by dividing each of said plurality of laminate blocks.

20. The method for manufacturing the capacitor element according to claim 19, further comprising the step of covering each of said pair of second cut surfaces of each of said plurality of laminate chips with a dielectric material.

\* \* \* \* \*